(12) United States Patent
Sumioka et al.

(10) Patent No.: US 7,778,214 B2
(45) Date of Patent: Aug. 17, 2010

(54) RELAY APPARATUS, RELAY METHOD, AND RELAY PROGRAM

(75) Inventors: Motoshi Sumioka, Kawasaki (JP); Ryuichi Matsukura, Kawasaki (JP); Shingo Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 580 days.

(21) Appl. No.: 11/848,538

(22) Filed: Aug. 31, 2007

(65) Prior Publication Data

US 2008/0080369 A1 Apr. 3, 2008

(30) Foreign Application Priority Data

Sep. 29, 2006 (JP) ............... 2006-268474

(51) Int. Cl.
H04B 7/14 (2006.01)
H04J 11/00 (2006.01)
H04Q 7/00 (2006.01)

(52) U.S. Cl. .................. 370/315; 370/203; 370/328

(58) Field of Classification Search ............... 370/203, 370/229, 230, 235, 241, 315, 328, 473; 714/748
See application file for complete search history.

(56) References Cited

U.S. PATENT DOCUMENTS

| | | | |
|---|---|---|---|
| 7,697,491 B2 * | 4/2010 | Nakajima et al. ........... 370/338 |
| 2002/0154600 A1 * | 10/2002 | Ido et al. .................... 370/216 |
| 2004/0196801 A1 * | 10/2004 | Hiramatsu .................. 370/328 |
| 2006/0062140 A1 * | 3/2006 | Sudo .......................... 370/203 |
| 2006/0258291 A1 | 11/2006 | Nakata et al. |
| 2007/0032198 A1 | 2/2007 | Sakamoto |
| 2007/0162810 A1 * | 7/2007 | Sato et al. ................... 714/748 |

FOREIGN PATENT DOCUMENTS

| | | |
|---|---|---|
| JP | 3253126 A | 11/1991 |
| JP | 7222251 A | 8/1995 |
| JP | 9069828 A | 3/1997 |
| JP | 2003283471 A | 10/2003 |
| JP | 2004187226 A | 7/2004 |
| JP | 2004320763 A | 11/2004 |

* cited by examiner

*Primary Examiner*—Afsar M. Qureshi
(74) *Attorney, Agent, or Firm*—Westerman, Hattori, Daniels & Adrian, LLP

(57) ABSTRACT

A relay apparatus for relaying a packet in radio communication by a wireless terminal in a communication area includes a packet monitoring part for obtaining data on a bandwidth to be used in the radio communication by the wireless terminal from a packet to be relayed, a bandwidth managing part for calculating and recording a total bandwidth in use used for the radio communication by the wireless terminal from the obtained data on a bandwidth, a retransmission adjusting part for determining an upper limit of a packet retransmission number, in accordance with an amount of an available bandwidth obtained by excluding a total bandwidth in use from a maximum bandwidth, and a retransmitting part for retransmitting a packet in a range not exceeding the upper limit of the packet retransmission number. Consequently, the relay apparatus enables retransmission appropriately adaptable to a use situation of a bandwidth by wireless communication of a wireless terminal in a communication area.

11 Claims, 21 Drawing Sheets

| Communication identifier | Codec | Frame rate | Bandwidth in use | Link speed | Priority | RSSI |
|---|---|---|---|---|---|---|
| 192.168.0.100:32267 | g.711 | 20ms | 128kbps | 11Mbps | 1st | 68% |
| 192.168.0.101:32267 | g.711 | 20ms | 128kbps | 11Mbps | 2nd | 68% |
| ... | ... | ... | ... | ... | ... | ... |

FIG. 3

| Upper limit number |
|---|
| 3 |

| r (Current retransmission number) | r_max (Upper limit) |
|---|---|
| 0 | 3 |

|  | Upper limit |
|---|---|
| Each packet | 4 |
| Sum of retransmission number within constant length of time | 6 |

FIG. 6A

| r (Current packet retransmission number) | r_max (Upper limit of retransmission number of each packet) | R (Sum of retransmission number within constant length of time) | R_max (Upper limit of sum of retransmission number within constant length of time) |
|---|---|---|---|
| 0 | 4 | 3 | 6 |

FIG. 6B

| Communication identifier | Upper limit |
|---|---|
| 192.168.0.100:32267 | 3 |
| 192.168.0.101:32267 | 5 |
| ⋮ | ⋮ |
| Other | 1 |
| Sum of retransmission number within constant length of time | 20 |

FIG. 8A

| Communication identifier | r (Current packet retransmission number) | r_max (Upper limit of retransmission number of each packet) |
|---|---|---|
| 192.168.0.100:32267 | 1 | 3 |
| 192.168.0.101:32267 | 0 | 5 |
| Other | 0 | 1 |

FIG. 8B

| Terminal ID | Retransmission timing | Packet transmission success rate |
|---|---|---|
| Terminal A | 0 | 70% |
| | 1 | 73% |
| | 2 | 76% |
| | 3 | 77% |
| | 4 | 71% |
| | 5 | 78% |
| Terminal B | 0 | 65% |
| ⋮ | ⋮ | ⋮ |

| During peak time (Available bandwidth is 100 kbps or less) | Communication identifier | Link speed | Packet transmission success rate |
|---|---|---|---|
| | 192.168.0.100:32267 | 11Mbps | 80% |
| | | 5.5Mbps | 90% |
| | | ⋮ | ⋮ |
| | 192.168.0.101:32267 | 11Mbps | 70% |
| | | 5.5Mbps | 75% |
| | | ⋮ | ⋮ |

35a

| During intermediate time (Available bandwidth is 101 kbps to 300 kbps) | Communication identifier | Link speed | Packet transmission success rate |
|---|---|---|---|
| | 192.168.0.100:32267 | 11Mbps | 83% |
| | | 5.5Mbps | 92% |
| | | ⋮ | ⋮ |
| | 192.168.0.101:32267 | 11Mbps | 77% |
| | | 5.5Mbps | 80% |
| | | ⋮ | ⋮ |

35b

| During off-peak time (Available bandwidth is 301 kbps or more) | Communication identifier | Link speed | Packet transmission success rate |
|---|---|---|---|
| | 192.168.0.100:32267 | 11Mbps | 85% |
| | | 5.5Mbps | 95% |
| | | ⋮ | ⋮ |
| | 192.168.0.101:32267 | 11Mbps | 83% |
| | | 5.5Mbps | 84% |
| | | ⋮ | ⋮ |

|  | Count of sequential packet losses |
|---|---|
| Terminal A | 0 |
| Terminal B | 2 |

|  | Packet loss | |
|---|---|---|
|  | Lower limit | Upper limit |
| Terminal A | 2 | 5 |
| Terminal B | 2 | 5 |

FIG. 19

| Communication identifier | Upper limit |
|---|---|
| 192.168.0.100:32267 | 3 |
| 192.168.0.101:32267 | 5 |
|  |  |
| Other: non-prioritized communication | 10 |
| Sum of retransmission number within constant length of time | 20 |

FIG. 22A

| Communication identifier | r (Current packet retransmission number) | r_max (Upper limit of retransmission number of each packet) |
|---|---|---|
| 192.168.0.100:32267 | 1 | 3 |
| 192.168.0.101:32267 | 0 | 5 |
| ⋮ | ⋮ | ⋮ |
| Other: non-prioritized communication | 0 | 10 |

FIG. 22B

RELAY APPARATUS, RELAY METHOD, AND RELAY PROGRAM

BACKGROUND OF THE INVENTION

1. Field of the Invention

The present invention relates to a relay apparatus for relaying, in a limited bandwidth, communication by a plurality of wireless terminals in a communication area, for example, as in access points in a wireless local area network (LAN).

2. Description of Related Art

Recently, for example, as in an IP telephone via a wireless LAN, a wireless terminal that performs a telephone conversation via radio communication has become widespread. The wireless terminal that performs a telephone conversation via radio communication enables a telephone conversation with a terminal on a partner side by performing radio communication with a relay apparatus (e.g., an access point of a wireless LAN, etc.). In such a communication form, a plurality of wireless terminals are present in a communication area of a relay apparatus, whereby simultaneous telephone conversations by the wireless terminals occur. In this case, the plurality of wireless terminals share a bandwidth available in the relay apparatus, and perform communication respectively.

Furthermore, generally, in radio communication between a wireless terminal and a relay apparatus, a packet transmission error rate is high due to the influence by an obstacle and the like. In the case where the relay apparatus fails in the transmission of a packet, it retransmits the packet until it succeeds in transmitting the packet. When a packet is retransmitted, a bandwidth in use increases accordingly, and when a bandwidth in use exceeds the capacity of transmission which relay apparatus manages, transmissions of radio terminals and relay apparatus interfere each other, and tend to end in failures. Therefore, the number of retransmissions should be as small as possible.

Conventionally, a method for preventing the number of retransmissions from increasing excessively in an OFDM-CDMA transmitter is proposed (e.g., see JP 2004-187226 A). According to this method, when the number of retransmissions increases, the increase in the number of retransmissions is prevented by increasing the number of sub-carriers of an OFDM.

However, according to the above-mentioned conventional method, only the communication state among individual apparatuses are taken into consideration. On the other hand, there is a demand for controlling the number of packet retransmissions in accordance with the entire use situation of a bandwidth by radio communication in a communication area. For example, during a peak time such as the simultaneous telephone conversations by a number of wireless terminals in a communication area, unless the number of retransmissions in radio communication by one wireless terminal is suppressed in accordance with an available bandwidth, the available bandwidth may be exhausted due to retransmissions. Consequently, the transmission of communication data of another wireless terminal may be delayed. Furthermore, during an off-peak time in which only one wireless terminal performs communication in a communication area, in spite of the fact that there is a sufficient available bandwidth for retransmissions, retransmissions of a previously set upper limit value or more cannot be performed, resulting in a packet transmission failure. According to the above-mentioned conventional method, since the entire use situation of a bandwidth for radio communication by wireless terminals in a communication area is not taken into consideration, the above-mentioned circumstances cannot be prevented.

SUMMARY OF THE INVENTION

Therefore, with the foregoing in mind, it is an object of the present invention to provide a relay apparatus, a relay method, and a relay program enabling a retransmission appropriately compliant with the entire use situation of a bandwidth for radio communication by wireless terminals in a communication area.

A relay apparatus according to the present invention for relaying a packet to be transmitted in radio communication by at least one wireless terminal in a communication area includes: a packet monitoring part for obtaining data on a bandwidth used in the radio communication by the wireless terminal from the packet to be relayed by the relay apparatus; a bandwidth managing part for calculating and recording a total bandwidth in use used for the radio communication by the wireless terminal in the communication area based on the data obtained by the packet monitoring part; a retransmission adjusting part for determining an upper limit of a packet retransmission number in accordance with an amount of an available bandwidth obtained by excluding the total bandwidth in use from a maximum bandwidth available in the radio communication by the wireless terminal; and a retransmitting part for retransmitting a packet whose transmission has ended in failure by the relay apparatus, in a range not exceeding the upper limit of the packet retransmission number determined by the retransmission adjusting part.

The retransmission adjusting part determines the upper limit of the packet retransmission number in accordance with the amount of the available bandwidth obtained by excluding the total bandwidth in use calculated based on the data obtained by the packet monitoring part from the maximum bandwidth available in the radio communication. Therefore, the upper limit of the number of retransmissions adaptable to the entire use situation of a bandwidth for the radio communication in the communication area is determined. The retransmitting part retransmits a packet whose transmission has ended in failure by the relay apparatus based on the upper limit of the number of retransmissions determined by the retransmission adjusting part. Therefore, the retransmission appropriately adaptable to the entire use situation of a bandwidth can be performed. Consequently, the communication quality of the radio communication by the wireless terminal in the communication area of the relay apparatus can be enhanced.

In the relay apparatus according to the present invention, it is preferable that the retransmission adjusting part divides the available bandwidth by the number of wireless terminals that perform the radio communication in the communication area to obtain an available bandwidth per wireless terminal, and determines the upper limit of the packet retransmission number for each wireless terminal, using the available bandwidth per wireless terminal.

According to the above configuration, the upper limit of the number of retransmissions per wireless terminal is determined by the available bandwidth per wireless terminal obtained by dividing the entire available bandwidth by the number of wireless terminals performing the radio communication. Therefore, one wireless terminal can be prevented from repeating retransmissions to use up the available bandwidth. Consequently, the degradation in communication quality at another wireless terminal in the communication area can be prevented. Furthermore, in the case where the entire available bandwidth is sufficient, the upper limit of the number of retransmissions per wireless terminal increases accordingly, and the possibility of success of packet transmission is increased by retransmitting a packet whose transmission has ended in failure by the relay apparatus.

In the relay apparatus according to the present invention, it is preferable that the retransmission adjusting part sets the upper limit of the packet retransmission number by the relay apparatus within a constant length of time in accordance with the available bandwidth.

By setting the upper limit of the packet retransmission number by the relay apparatus within a constant length of time, the transmission of a packet other than the retransmission packet is ensured within the constant length of time. Therefore, one wireless terminal can be prevented from repeating retransmissions, thereby allowing a time during which the transmission of a packet other than the retransmission packet cannot be performed to continue for a constant length of time or longer.

In the relay apparatus according to the present invention, it is preferable that the retransmission adjusting part sets the upper limit of the packet retransmission number for each radio communication performed by the wireless terminal. This enables the communication quality to be adjusted for each radio communication.

It is preferable that the relay apparatus according to the present invention further includes a transmission history recording part for recording a communication identifier for identifying communication of the packet to be relayed by the relay apparatus and relationship data that represents a relationship between a link speed in communication represented by the communication identifier and a packet transmission success rate, wherein when retransmitting the packet of the communication represented by the communication identifier recorded in the transmission history recording part, the retransmitting part applies a link speed at which the packet transmission success rate in the communication represented by the communication identifier is highest based on the relationship data, and retransmits the packet based on the applied link speed.

The retransmitting part retransmits a packet based on the link speed at which the packet transmission success rate is highest in the communication represented by the communication identifier recorded in the transmission history recording part. Therefore, the packet can be retransmitted at a link speed at which the possibility of transmission success in each communication is high.

The relay apparatus according to the present invention further includes a retransmission history recording part for recording relationship data that represents a relationship between a retransmission timing of a packet retransmitted by the retransmitting part and a packet transmission success rate, wherein the retransmitting part determines a retransmission timing at which the packet transmission success rate is highest based on the relationship data, and determines a transmission interval at which a packet whose transmission has ended in failure by the relay apparatus based on the determined retransmission timing.

The retransmitting part determines a transmission interval at which a packet is retransmitted based on the retransmission timing at which the packet transmission success rate is highest, so that the packet can be retransmitted at a transmission interval at which the possibility of success of transmission is high.

The relay apparatus according to the present invention further includes a packet loss history recording part for recording a history of a packet loss caused by a packet transmission failure of the relay apparatus for each wireless terminal; and an acceptable information recording part for recording data that represents a condition of a count of sequential packet losses acceptable in the radio communication for each wireless terminal, wherein the packet monitoring part obtains data that represents a condition of the count of sequential packet losses acceptable in the radio communication of the wireless terminal from a packet to be relayed by the relay apparatus and records the data in the acceptable information recording part, and the retransmitting part obtains a count of sequential packet losses at a destination wireless terminal to which a packet is transmitted and result in transmission failure from the packet loss history recording part, determines whether or not count of the sequential packet losses obtained from the packet loss history part corresponds to the condition of the count of the sequential packet losses acceptable in the radio communication of the destination wireless terminal represented by the data recorded in the acceptable information recording part, and in a case where count of the sequential packet losses obtained from the packet loss history part corresponds to the condition, discards the packet without retransmitting it.

The packet loss means that transmission and all retransmissions of a packet has ended in failure. In the case where a packet received from a wireless terminal contains data that represents the count of the sequential packet losses capable of accepting a packet loss, the data representing the count of sequential packet losses acceptable is recorded in the acceptable information recording part by the packet monitoring part. Therefore, the retransmitting part obtains a count of sequential packet losses of a packet whose transmission has ended in failure from the packet loss history recording part storing the count of sequential packet losses, and compares the count of sequential packet losses with the condition of an acceptable count of sequential packet losses recorded in the acceptable information recording part, thereby determining the necessity/unnecessity of retransmission can be determined. Consequently, the retransmitting part can reduce the number of retransmissions as a whole by discarding a packet in wireless communication accepting a packet loss without retransmitting it.

It is preferable that the relay apparatus according to the present invention further includes a retransmission number sending part for notifying the wireless terminal of an upper limit of the packet retransmission number determined by the retransmission adjusting part.

According to the above configuration, in the case where the wireless terminal fails in the transmission of a packet to a relay apparatus, the wireless terminal can retransmit a packet in a range not exceeding an upper limit of the packet retransmission number notified from the retransmission number sending part. Consequently, the wireless terminal can retransmit a packet with the number of retransmissions in accordance with the use situation of a bandwidth in the communication area.

It is preferable that the relay apparatus according to the present invention further includes a prioritized communication recording part for recording a prioritized communication identifier that represents prioritized communication through which the relay apparatus relays a packet by priority; and a priority control part for sending the packet in the prioritized communication represented by the prioritized communication identifier by priority, wherein the retransmission adjusting part determines an upper limit of a packet retransmission number, in accordance with an amount of an available bandwidth obtained by excluding the total bandwidth in use from the maximum bandwidth available in the radio communication of the relay apparatus, only with respect to a packet of the prioritized communication, and the retransmitting part retransmits the packet in the communication represented by the prioritized communication identifier among packets whose transmissions have ended in failure by the relay apparatus in a range not exceeding the upper limit of the packet retransmission number determined by the retransmission adjusting part, and retransmits a packet in communication other than the prioritized communication represented by the prioritized communication identifier among packets whose transmissions have ended in failure by the relay apparatus by a predetermined number of times.

According to the above configuration, regarding the prioritized communication in which a packet is relayed by priority by the priority relaying part, the packet can be retransmitted in a range not exceeding an upper limit of the packet retransmission number in accordance with the use situation of a bandwidth, and regarding the non-prioritized communication other than the prioritized communication, the number of retransmissions corresponding to the previously determined number can be ensured. Therefore, in the prioritized communication, the number of retransmissions is suppressed from increasing to cause the delay due to an insufficient bandwidth. On the other hand, in the non-prioritized communication, although the possibility of the occurrence of a delay increases compared with the prioritized communication, the number of retransmissions is ensured, so that the occurrence of a packet loss is suppressed.

A relay method according to the present invention for relaying a packet to be transmitted in radio communication by at least one wireless terminal in a communication area includes obtaining data on a bandwidth used in the radio communication by the wireless terminal from the packet to be relayed by the relay apparatus; calculating and recording a total bandwidth in use used for the radio communication by the wireless terminal in the communication area based on the obtained data; determining an upper limit of a packet retransmission number in accordance with an amount of an available bandwidth obtained by excluding the total bandwidth in use from a maximum bandwidth available in the radio communication by the wireless terminal; and retransmitting a packet whose transmission has ended in failure by the relay apparatus, in a range not exceeding the upper limit of the packet retransmission number.

A relay program according to the present invention causes a relay apparatus including a computer to execute processing of relaying a packet to be transmitted in wireless communication by at least one wireless terminal in a communication area, the relay program causing the relay apparatus to execute packet monitoring processing of obtaining data on a bandwidth used in radio communication by the wireless terminal from the packet to be relayed by the relay apparatus; bandwidth management processing of calculating and recording a total bandwidth in use used for the radio communication by the wireless terminal in the communication area based on the data obtained in the packet monitoring processing; retransmission adjustment processing of determining an upper limit of a packet retransmission number, in accordance with an amount of an available bandwidth obtained by excluding the total bandwidth in use from a maximum bandwidth available in the radio communication by the wireless terminal; and retransmission processing of retransmitting a packet whose transmission has ended in failure by the relay apparatus in a range not exceeding the upper limit of the packet retransmission number determined by the retransmission adjusting processing.

According to the present invention, a relay apparatus, a relay method, and a relay program enabling the retransmission appropriately adaptable to the entire use situation of a bandwidth in radio communication by a wireless terminal in a communication area can be provided.

These and other advantages of the present invention will become apparent to those skilled in the art upon reading and understanding the following detailed description with reference to the accompanying figures.

BRIEF DESCRIPTION OF THE DRAWINGS

FIG. 3 is a diagram showing examples of data to be recorded in a bandwidth information recording part.

FIG. 6A is a diagram showing data on an upper limit value of the number of retransmissions in Embodiment 1. FIG. 6B is a diagram showing examples of data on variables r, r_max, R, and R_max.

FIG. 8A is a diagram showing examples of data on an upper limit value of the number of retransmissions in Embodiment 1, and FIG. 8B is a diagram showing examples of data on variables r and r_max corresponding to each communication identifier.

FIG. 12 is a diagram showing examples of data to be recorded in a retransmission history recording part.

FIG. 15 is a diagram showing examples of data recorded in a transmission history recording part.

FIG. 18 is a diagram showing examples of data to be recorded in a packet loss history recording part.

FIG. 19 is a diagram showing examples of data to be recorded in an acceptable information recording part.

FIG. 22A is a diagram showing examples of data recorded in a retransmission number recording part. FIG. 22B is a diagram showing examples of data on variables used in accordance with the determination in Op 3 in FIG. 23.

DETAILED DESCRIPTION OF THE INVENTION

Embodiment 1

Figure 1:
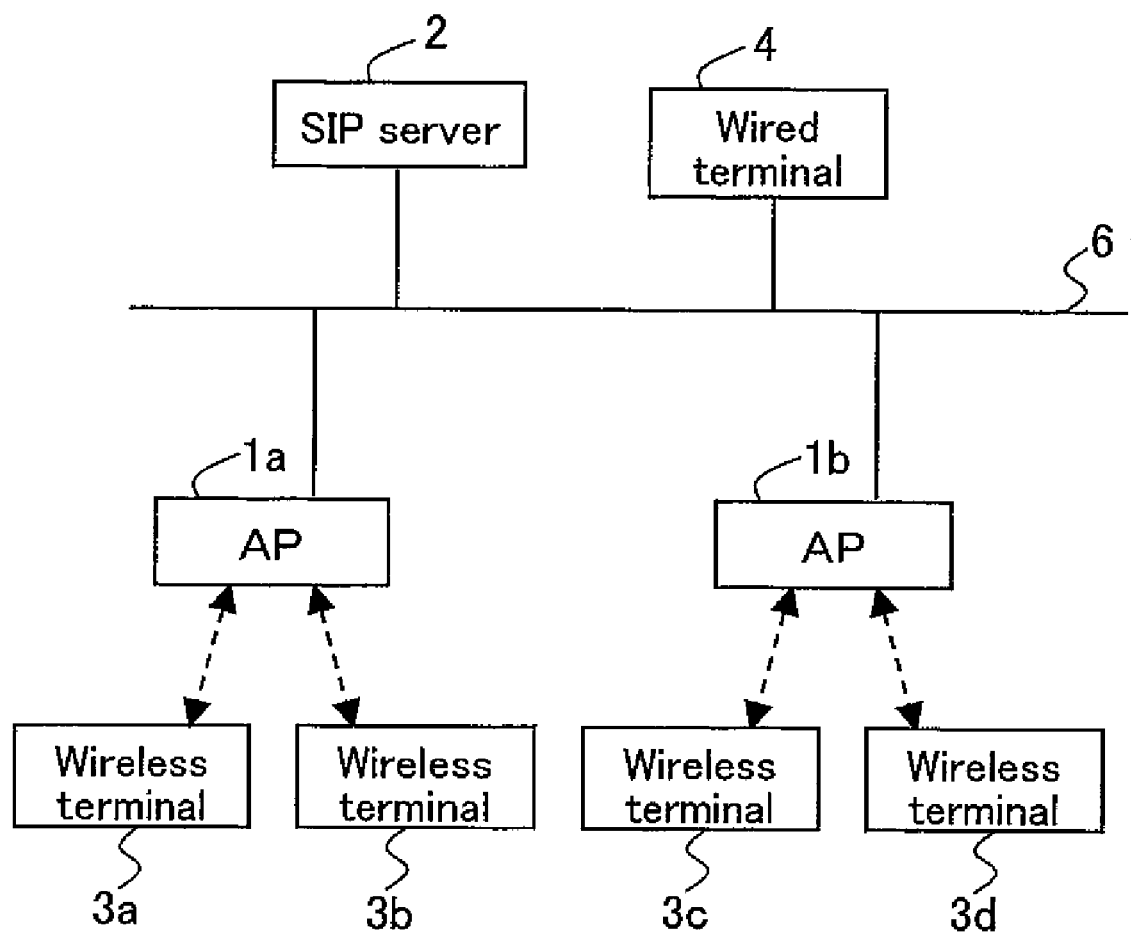
FIG. 1 is a functional block diagram showing a configuration of an entire communication system including APs according to Embodiment 1.

Embodiment 1 is the case where a relay apparatus is a wireless LAN access point (hereinafter, referred to as an "AP"), as an example. FIG. 1 is a functional block diagram showing a configuration of APs according to the present embodiment together with a function of an entire communication system including the APs. The communication system shown in FIG. 1 enables the communication by wireless IP telephones using a wireless LAN, for example.

The communication system shown in FIG. 1 includes an AP 1a, an AP 1b, a session initiation protocol (SIP) server 2, and a wired terminal 4 that are connected to a wired LAN 6, wireless terminals 3a, 3b in a communication area of the AP 1a, and wireless terminals 3c, 3d in a communication area of the AP 1b. The wireless terminals 3a, 3b and the wired terminal 4 have a function of an IP telephone terminal. The number of APs connected to the wired LAN 6 is not limited to two as shown in FIG. 1. Furthermore, the number of wireless terminals that may be present in each communication area of the AP 1a and the AP 1b is not limited to two. Furthermore, appliances other than the AP 1a, the AP 1b, the SIP server 2, and the wired terminal 4 may be connected to the wired LAN 6.

The SIP server 2 is an example of a communication control server in an IP telephone network, and controls the start, change, and completion of communication by at least two communication terminals among a plurality of communication terminals including the wireless terminals 3a-3d and the wired terminal 4. The SIP server 2 controls the start, change, and completion of communication based on an SIP. For example, the SIP server 2 receives a communication start request (invite message) sent from any of the wireless terminals 3a-3d and the wired terminal 4, and generates a call between terminals that are going to start communication. Furthermore, the SIP server 2 receives a communication completion request (bye message) sent from any of the wireless terminals 3a-3d and the wired terminal 4, and completes a call between terminals that are going to complete communication. The communication control is not limited to the above-mentioned communication control based on the SIP.

(Configuration of AP)

Figure 2:
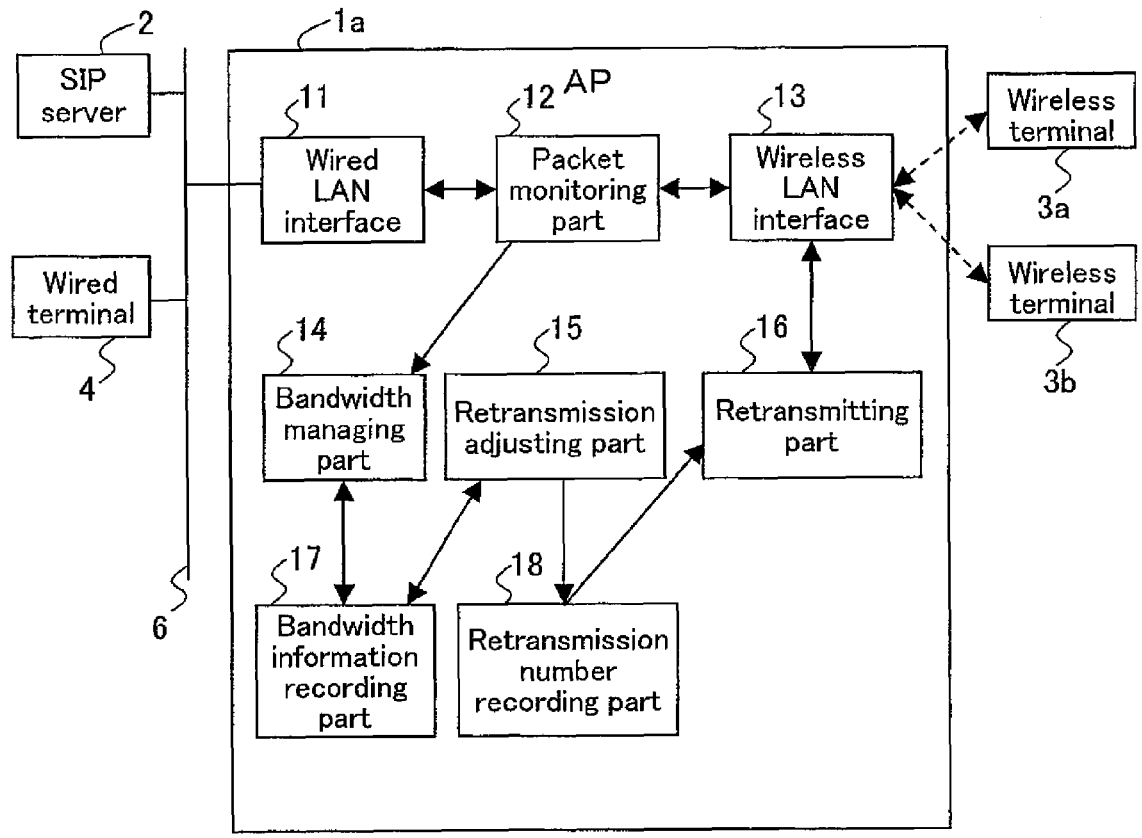
FIG. 2 is a functional block diagram showing a configuration of an AP according to Embodiment 1.

FIG. 2 is a functional block diagram showing a configuration of the AP 1a. Since the configuration of the AP 1b shown in FIG. 1 is similar to that of the AP 1a shown in FIG. 2, the description thereof will be omitted. The AP 1a includes a wired LAN interface 11, a packet monitoring part 12, a wireless LAN interface 13, a bandwidth managing part 14, a retransmission adjusting part 15, a retransmitting part 16, a bandwidth information recording part 17, and a retransmission number recording part 18.

Examples of the hardware constituting the AP 1a include an antenna, a modulation circuit, an amplifier circuit, a demodulation circuit, a microprocessor, and a recording device. Each function of the wired LAN interface 11, the packet monitoring part 12, the bandwidth managing part 14, the retransmission adjusting part 15, and the retransmitting part 16 is realized when the microprocessor executes a predetermined program. The function of the wireless LAN interface 13 is realized by, for example, the antenna, the modulation circuit, the amplifier circuit, the demodulation circuit, and the microprocessor. Furthermore, the bandwidth information recording part 17 and the retransmission number recording part 18 are embodied by a recording device such as a semiconductor memory, a magnetic memory, or an optical memory.

The wired LAN interface 11 mediates the exchange of data between the AP 1a and the wired LAN 6 in conformity with the specification of the wired LAN. The wireless LAN interface 13 mediates the wireless exchange of data between the wireless terminals 3a, 3b and the AP 1a in conformity with the specification of the wireless LAN. The wireless LAN interface 13 and the wired LAN interface 11 relay the communication between the wireless terminals 3a, 3b and the wired LAN 6.

The wireless LAN interface 13 exchanges data with the wireless terminals 3a, 3b on a packet basis. In the case where the transmission of a packet from the AP 1a to the wireless terminals 3a, 3b has ended in failure, the retransmitting part 16 controls the wireless LAN interface 13 so as to retransmit a packet repeatedly until it succeeds in the transmission of the packet. Herein, the number of retransmissions to be repeated is referred to as the number of retransmissions. An upper limit is set to the number of retransmissions, and a packet whose transmission has not ended in success even when the number of retransmissions reaches the upper limit is discarded. Consequently, a loss of packet occurs.

The packet monitoring part 12 obtains data regarding a bandwidth used in radio communication between the wireless terminals 3a, 3b and the AP 1a from a packet passing through the wireless LAN interface 13 and a packet passing through the wired LAN interface 11, and passes the obtained data to the bandwidth managing part 14.

The bandwidth managing part 14 calculates a total bandwidth in use, which is used in radio communication by the wireless terminals 3a, 3b in the communication area of the AP 1a, using the data passed from the packet monitoring part 12, and records the total bandwidth in use in the bandwidth information recording part 17.

The retransmission adjusting part 15 determines an upper limit value of the number of packet retransmissions, using the total bandwidth in use recorded in the bandwidth information recording part 17, and records the upper limit value in the retransmission number recording part 18. The retransmission adjusting part 15 determines an upper limit of the number of packet retransmissions in accordance with the amount of an available bandwidth obtained by excluding the total bandwidth in use from a maximum bandwidth available in radio communication of the AP 1a.

The retransmitting part 16 retransmits a packet whose transmission has ended in failure to the wireless LAN interface 13 in a range not exceeding the upper limit of the number of packet retransmissions recorded in the retransmission number recording part 18.

(Detail of Functions of Packet Monitoring Part 12 and Bandwidth Managing Part 14)

Hereinafter, a specific example of the function will be described, in which the packet monitoring part 12 obtains data on a bandwidth from a packet passing through the AP 1a, and the bandwidth managing part 14 records bandwidth information based on the data.

Among the packet passing through the wireless LAN interface 13 and the packet passing through the wired LAN interface 11, the packet monitoring part 12 may extract, for example, a call control message of communication whose start, change, completion, and the like are controlled by the SIP server 2, and pass the call control message to the bandwidth managing part 14. More specifically, the packet monitoring part 12 can extract a packet of a communication start request, a packet of a communication completion request, and the like, and pass them to the bandwidth managing part 14. Because of this, the bandwidth managing part 14 obtains information on the start and completion of communication performed via the AP 1a. Furthermore, the packet of the communication start request contains information (e.g., a codec, a frame rate, etc.) on the bandwidth used in communication to be started, so that the bandwidth managing part 14 can also obtain information on a bandwidth by receiving the communication start request.

As a specific example, the case will be described in which the packet monitoring part 12 monitors an SIP packet passing through the wireless LAN interface and an SIP packet passing through the wired LAN interface 11, and passes an invite packet and a bye packet among the SIP packets to the bandwidth managing part 14.

The invite packet is an example of the packet representing a communication start request. The invite packet includes, for example, information on an IP address and a port number of a wireless terminal that is going to start communication, a frame rate, a codec, etc. When receiving the invite packet, the bandwidth managing part 14 records information contained in the invite packet in the bandwidth information recording part 17.

FIG. 3 is a diagram showing examples of data to be recorded in the bandwidth information recording part 17. In the examples shown in FIG. 3, a communication identifier, a codec, a frame rate, a bandwidth in use, a link speed, a priority, and a received signal strength indicator (RSSI) are recorded in a bandwidth management table 21 for each communication. The communication identifier is represented by, for example, an IP address and a port number of a wireless terminal that performs the communication.

When receiving the invite packet, the bandwidth managing part 14 adds and records an IP address and a port number of a wireless terminal included in the invite packet, a frame rate, a codec, a priority, and an RSSI in the bandwidth management table 21. Furthermore, the bandwidth managing part 14 calculates a bandwidth in use, which is used in the communication, from the frame rate and the codec, and records the calculated bandwidth in use. Furthermore, the bandwidth managing part 14 also obtains a link speed of the invite packet from the wireless LAN interface 13 and records it. Thus, in the bandwidth management table 21, information on the bandwidth of communication performed via the AP 1a is recorded in the mass.

Herein, an example of setting of a priority will be described. For example, the SIP server 2 creates a table recording a priority for each user ID (telephone number, etc.), determines a priority with reference to the table when receiving a communication start request from a user, and adds the priority to SDP data of an invite packet to be sent to a communication partner destination or an external part of the SDP data. The bandwidth managing part 14 receives the invite packet, and records the priority in the bandwidth managing table 21. Furthermore, as an example different from that determined by the SIP server 2, a setting file, in which priority information associated with an IP address and a port number may be recorded in the AP 1a.

Furthermore, since the RSSI is added to the packet transmitted/received by the wireless LAN interface 13, the packet monitoring part 12 can read the RSSI and notify the bandwidth managing part 14 of the RSSI.

When receiving a bye packet for requesting the completion of communication, the bandwidth managing part 14 deletes information on communication represented by an IP address and a port number of a wireless terminal included in the bye packet from the bandwidth management table 21. Consequently, information only on the communication that is currently being performed is recorded in the bandwidth management table 21. Therefore, the bandwidth managing part 14 calculates a sum of bandwidth in use of each communication recorded in the bandwidth management table 21, thereby obtaining a current total bandwidth in use in the AP 1a.

Herein, although the case has been described in which the bandwidth managing part 14 records information on a bandwidth based on a call control message from the communication control server (herein, the SIP server 2) of the outside such as an invite packet and a bye packet, the data to be the base for information on a bandwidth is not limited to a call control message. Hereinafter, data to be the base for information on a bandwidth and other examples will be described.

For example, the packet monitoring part 12 may extract a real-time transport protocol (RTP) packet among a packet passing through the wireless LAN interface 13 and a packet passing through a wired LAN interface 11, and pass the packet to the bandwidth managing part 14. Since the RTP packet contains a codec and a time stamp, the bandwidth managing part 14 can calculate a bandwidth in use for each communication based on these pieces of information.

Furthermore, the packet monitoring part 12 may notify the bandwidth managing part 14 of the number and size of packets passing through the wireless LAN interface 13 within a constant length of time, and an average link speed within the constant length of time. The bandwidth managing part 14 can calculate a bandwidth that is currently being used in the AP 1a, based on the notified data.

(Operation Example 1 of Retransmission Adjusting Part 15 and Retransmitting Part 16)

Next, a specific example of the case will be described in which the retransmission adjusting part 15 determines an upper limit value of the number of packet retransmissions and retransmits a packet based on the upper limit value.

First, the retransmission adjusting part 15 determines an upper limit of the number of retransmissions, using the sum of bandwidths in use obtained in the bandwidth managing part 14. Specifically, the retransmission adjusting part 15 calculates the amount of an available bandwidth with respect to an available bandwidth obtained by excluding the total bandwidth in use from the maximum bandwidth that can be used for radio communication of the AP 1a. The amount of the available bandwidth is divided by the number of communications that are currently being performed via the AP 1a to obtain an available bandwidth per communication, and the number of retransmissions per packet is determined based on this value. It is assumed that the maximum bandwidth that can be used for radio communication of the AP 1a is, for example, recorded in a recording device such as a memory of the AP 1a at the time of shipping of the AP 1a.

Herein, an example of calculation of determining the number of retransmissions using the data in the bandwidth management table 21 shown in FIG. 3 will be described. The sum (128+128=) "256 kbps" of the bandwidths in use is obtained from the data of the bandwidth management table 21. Herein, assuming that the maximum bandwidth that can be used for radio communication of the AP 1a is "1000 kbps", the retransmission adjusting part 15 calculates an available bandwidth to be (1000−256=) "744 kbps". It is understood from the data of the bandwidth management table 21 that the number of communications that are being relayed by the AP 1a is "2". Therefore, the retransmission adjusting part 15 divides the available bandwidth "744 kbps" by the number of communications "2" to obtain an available bandwidth "372 kbps" per communication. The retransmission adjusting part 15 sets "3" to be the number of retransmissions, which is obtained by dividing the available bandwidth "372 kbps" per communication by the bandwidth in use "128 kbps" of one communication, and rounding off fractions of a decimal point of the obtained number.

Herein, although the bandwidth in use in any communication is "128 kbps", in the case where the bandwidth in use varies depending upon communication, it is preferable to calculate the number of retransmissions for each communication. For example, when the link speed changes from 11 Mbps to 5.5 Mbps in the communication shown in FIG. 3, the bandwidth in use changes from "128 kbps" to "256 kbps". In such a case, the number of retransmissions of that communication becomes "1" that is obtained by dividing the available bandwidth "372 kbps" per communication by the bandwidth in use "256 kbps" of one communication, followed by rounding off fractions of a decimal point of the obtained number.

Figures 4A, 4B, 5:
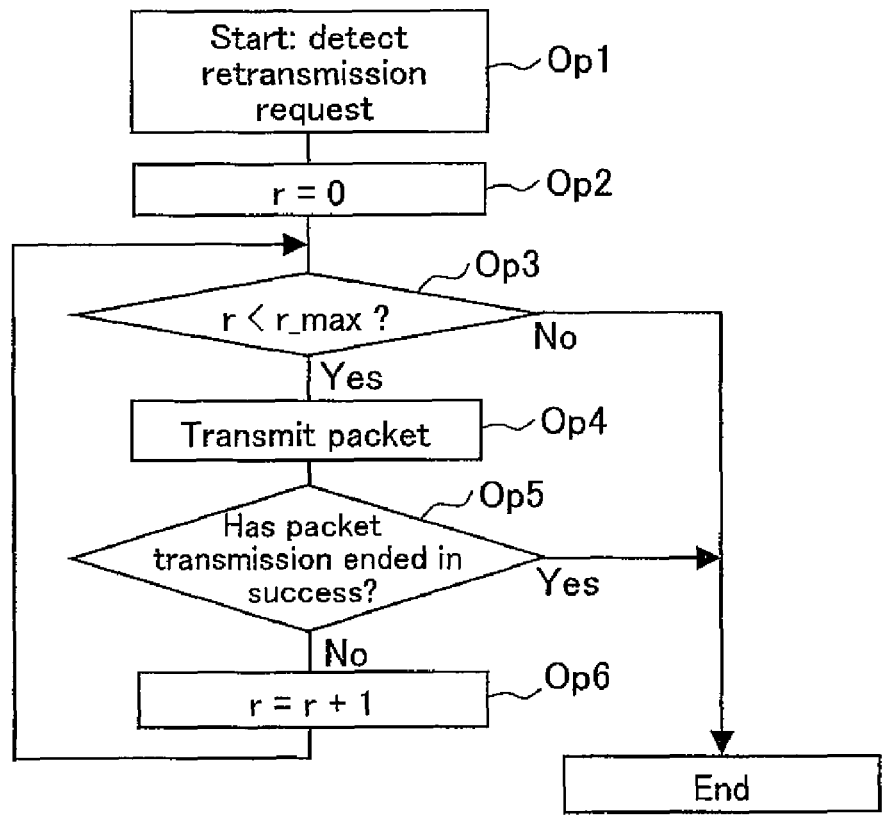
FIG. 4A is a diagram showing an example of data to be recorded in a retransmission number recording part.
FIG. 4B is a diagram showing examples of data on variables r and r_max.
FIG. 5 is a flowchart showing an example of retransmission processing in a retransmitting part in Embodiment 1.

The retransmission adjusting part 15 records the calculated number of retransmissions in the retransmission number recording part 18. FIG. 4A is a diagram showing an example of data to be recorded in the retransmission number recording part 18. The retransmission adjusting part 15 periodically calculates the number of retransmissions at a predetermined time interval, and periodically updates the data of the retransmission number recording part 18. Because of this, the number of retransmissions is updated in accordance with the change in the use situation of a bandwidth.

The calculation of an upper limit of the number of retransmissions of the retransmission adjusting part 15 is an example, and the data representing the calculation method and the upper limit of the number of retransmissions is not limited thereto. For example, the upper limit may be represented by a bandwidth available for retransmission, instead of the number of retransmissions as shown in FIG. 4A.

The retransmission adjusting part 15 may determine the number of retransmissions, further using a priority or an RSSI recorded in the bandwidth management table 21. For example, the retransmission adjusting part 15 can correct the number of retransmissions calculated as described above in accordance with the priority. In this case, the retransmission adjusting part 15 may add "+1" to the number of retransmissions of communication with a priority of "1st", "+0," to the number of retransmissions of communication with a priority of "2nd", and "−1" to the number of retransmissions of communication with a priority equal to or lower than "+0".

Furthermore, an example of the case using the RSSI will be described. In general, as the RSSI is worse, the number of retransmissions until the transmission of a packet ends in success tends to increase. More specifically, there is a relationship between the RSSI and the number of retransmissions (referred to as a retransmission expectation number) expected until the transmission of a packet ends in success. Therefore, the retransmission expectation number can be obtained from the RSSI, using this relationship. The retransmission adjusting part 15 may obtain the retransmission expectation number of each communication from the RSSI of each communication, and calculate the retransmission number of each communication based on the retransmission expectation number of each communication.

Next, a specific example of the retransmission processing of the retransmitting part 16 will be described. FIG. 5 is a flowchart showing an example of the retransmission processing of the retransmitting part 16. As shown in FIG. 5, when detecting that the wireless LAN interface 13 has failed in the transmission of a packet with respect to a destination wireless terminal and received a retransmission request, the retransmitting part 16 starts retransmission processing (Op 1). The retransmitting part 16 initializes a variable r representing the current number of transmissions (Op 2). After that, the retransmitting part 16 determines whether or not the number of retransmissions has reached an upper limit (Op 3). Specifically, the retransmitting part 16 determines whether or not the variable r representing the current number of retransmissions is smaller than a variable r_max representing an upper limit. FIG. 4B is a diagram showing examples of data on the variables r and r_max. Herein, r_max records the same value as the upper limit (see FIG. 4A) of the number of retransmissions recorded by the retransmission adjusting part 15.

The retransmitting part 16 initializes the variable r to be "0" at a predetermined period in parallel with the processing shown in FIG. 5. Consequently, the number of packet retransmissions is controlled at a predetermined period. Furthermore, the variable r_max is updated at a predetermined time interval by the retransmission adjusting part 15. The purpose for this is to update the upper limit value r_max in accordance with the change in use situation of a bandwidth in the AP 1a.

More specifically, the retransmitting part 16 compares the upper limit of the number of retransmissions to be updated in accordance with the bandwidth in use at a predetermined interval by the retransmission adjusting part 15 with the current number of retransmissions.

In the case where the number of retransmissions has reached the upper limit (No in Op 3), the retransmission processing is completed. In the case where the number of retransmissions has not reached the upper limit (Yes in Op 3), the retransmitting part 16 transmits a packet whose transmission has ended in failure to a destination wireless terminal via the wireless LAN interface 13 (Op 4). In the case where the packet transmitted in Op 4 has reached the destination wireless terminal, more specifically, the packet transmission has ended in success (Yes in Op 5), the retransmission processing is completed.

In the case where the packet transmission has ended in failure (No in Op 5), the retransmitting part 16 adds "1" to the variable r representing the current number of retransmissions (Op 6), returns to Op 3 again, and determines whether or not the number of retransmissions has reached the upper limit. After that, the processes after Op 3 are repeated. Consequently, the packet retransmission is repeated until the number of retransmissions reaches the upper limit.

(Operation Example 2 of Retransmission Adjusting Part 15 and Retransmitting Part 16)

A modified example of the operation will be described in which the retransmission adjusting part 15 determines an upper limit value of the number of packet retransmissions, and the retransmitting part 16 retransmits a packet based on the upper limit value. FIG. 6A is a diagram showing data on an upper limit value of the number of retransmissions in the modified example. As shown in FIG. 6A, the retransmission adjusting part 15 records an upper limit of the number of retransmissions of each packet and an upper limit of the sum of the number of retransmissions within a constant length of time. The upper limit of the number of retransmissions of each packet is calculated, for example, in the same way as in the above-mentioned Operation example 1. The upper limit of the sum of the number of retransmissions within a constant length of time can be determined based on a value obtained by dividing an entire available bandwidth in the AP 1a by an average bandwidth in use per communication.

An example of calculating an upper limit of the sum of the number of retransmissions within a constant length of time using the data in the bandwidth management table 21 shown in FIG. 3 will be described below. It is understood from the data in the bandwidth management table 21 that the entire available bandwidth is "744 kbps", and the average bandwidth in use per communication is "128 kbps". The retransmission adjusting part 15 can calculate "6" obtained by dividing "744 kbps" by "128 kbps", followed by rounding off fractions of a decimal point of the obtained number as an upper limit of the sum of the number of retransmissions within a constant length of time.

Figure 7:
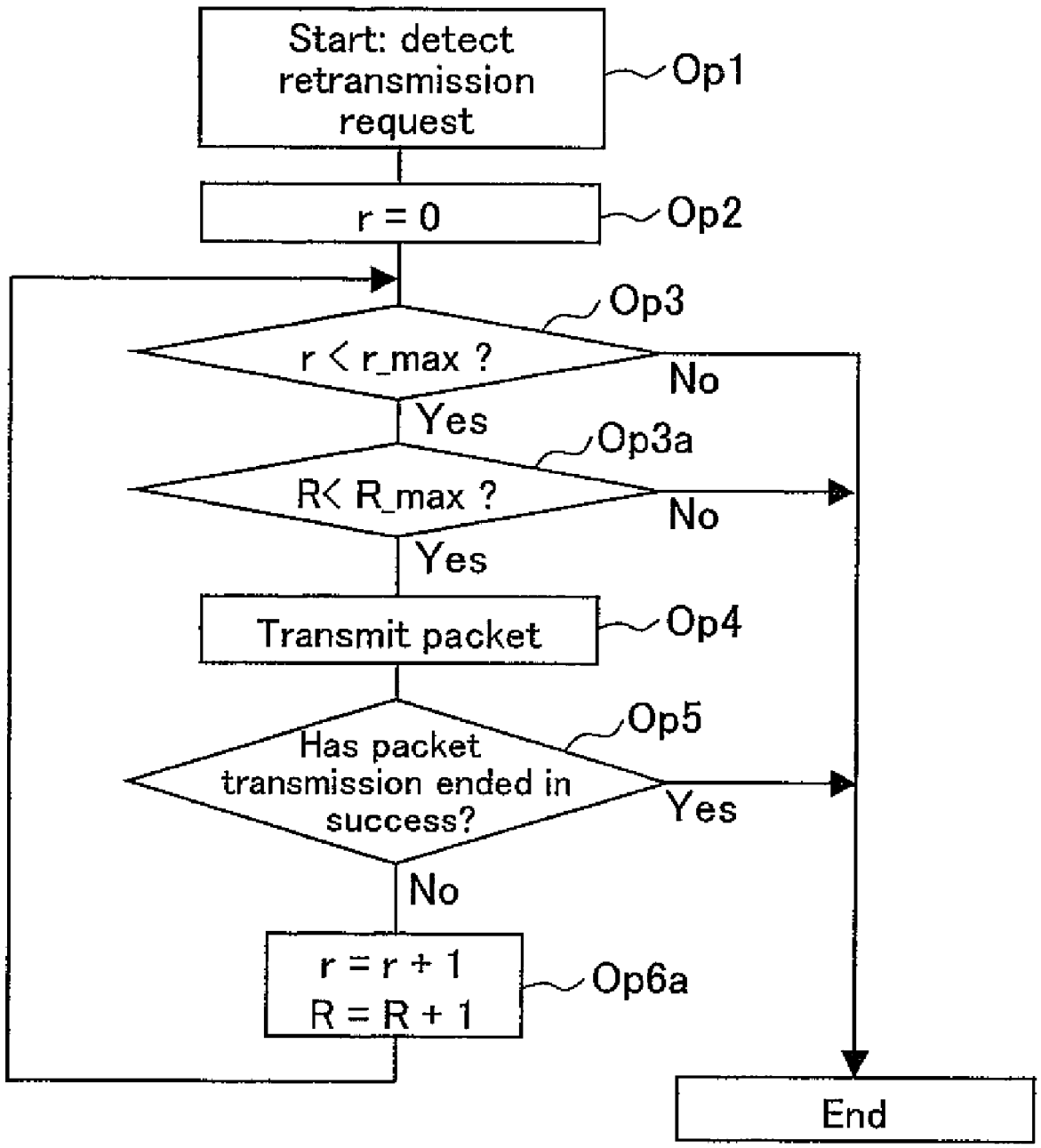
FIG. 7 is a flowchart showing an example of processing in which a retransmitting part retransmits data using an upper limit of the number of retransmissions of each packet and an upper limit of a sum of the number of retransmissions during a constant length of time.

FIG. 7 is a flowchart showing an example of the processing in which the retransmitting part 16 retransmits a packet, using an upper limit of the number of retransmissions of each packet and an upper limit of the sum of the number of retransmissions within a constant length of time. In the example shown in FIG. 7, the same operations as those in FIG. 5 are denoted with the same reference numerals as those therein, and the description thereof will be omitted. After determining whether or not the number of retransmissions of the packet to be retransmitted currently has reached the upper limit, the retransmitting part 16 determines whether or not the sum of the number of retransmissions within a constant length of time has reached the upper limit (Op 3a). The retransmitting part 16 makes the above determination based on whether or not the variable R representing the sum of the number of retransmissions within a constant length of time is smaller than the variable R_max representing the upper limit. FIG. 6B shows examples of data on the variables r, r_max, R, and R_max. In r_max and R_max, the same values as those of the upper limit (see FIG. 6A) of the number of retransmissions recorded by the retransmission adjusting part 15 are recorded. The retransmitting part 16 periodically initializes the variable R to "0" at a period of the above-mentioned constant length of time in parallel to the processing shown in FIG. 7. Consequently, the variable R becomes a value representing the sum of the number of packet retransmissions within the constant length of time.

In the case where the sum of the number of retransmissions within a constant length of time has reached the upper limit (No in Op 3a), the retransmission processing is completed. Consequently, even if the number of packet retransmissions has not reached the upper limit of the number of retransmissions of each packet, when the sum of the number of packet retransmissions within a constant length of time has reached the upper limit, the retransmitting part 16 does not perform a retransmission any more. This can prevent the communication within a constant length of time from being occupied with the retransmission processing to cause the shortage of a bandwidth. Furthermore, by setting the upper limit to the number of packet retransmissions within a constant length of time, even if the upper limit of the number of retransmissions of each packet is set to be larger, the bandwidth can be prevented from being used up only by the retransmissions.

In the case where the sum of the number of retransmissions in a predetermined time has not reached the upper limit (Yes in Op 3a), the retransmitting part 16 transmits a packet whose transmission has ended in failure (Op 4). In the case where the transmission of a packet has ended in success (Yes in Op 5), the retransmission processing is completed. In the case where the packet transmission has ended in failure (No in Op 5), the retransmitting part 16 adds "1" to the variable r representing the current number of retransmissions, and also adds "1" to the variable R representing the sum of the number of retransmissions (Op 6a), whereby the processes after Op 3 are repeated. Consequently, until either the number of retransmissions of a packet to be retransmitted or the sum of the number of retransmissions within a constant length of time has reached an upper limit, the packet retransmission is repeated. It is preferable that the retransmission adjusting part 15 updates the variable R_max at a predetermined time interval in accordance with the use situation of a bandwidth. Consequently, the upper limit value R_max is updated in accordance with the change in the use situation of the bandwidth in the AP 1a.

(Operation Example 3 of Retransmission Adjusting Part 15 and Retransmitting Part 16)

Next, another modified example of the operation will be described in which the retransmission adjusting part 15 determines an upper limit value of the number of packet retransmissions, and the retransmitting part 16 retransmits a packet based on the upper limit value. FIG. 8A is a diagram showing data on an upper limit value of the number of retransmissions in the present modified example. In the examples shown in FIG. 8A, an upper limit corresponding to each communication identifier representing the communication performed via the AP 1a is recorded. Furthermore, an upper limit of the number of retransmissions of communication (other) other than the communication represented by the communication identifier and an upper limit of the sum of the number of retransmissions within a constant length of time are recorded.

The retransmission adjusting part 15 can calculate an upper limit of the number of retransmissions for each communication, using a link speed, a priority, and an RSSI, as described in the above-mentioned Operation example 1. Thus, by setting an upper limit value for each communication, the quality of communication can be adjusted for each communication.

A method for calculating an upper limit of the number of retransmissions for each communication is not limited to the method described in the above Operation example 1. For example, in the case of relaying a packet of multi-medium communication including a stream of a plurality of medium types such as a voice stream and a video stream through the AP 1a, the retransmission adjusting part 15 can also change an upper limit value of the number of retransmissions depending upon the media type of a stream, for example. Consequently, the retransmission control suitable for a medium type of each stream can be performed. In this case, the retransmission adjusting part 15 can assign weights in accordance with each medium type to the upper limit of the number of retransmissions for each medium type. For example, the retransmission adjusting part 15 can set, as an upper limit of the number of retransmissions in each stream, a value obtained by multiplying the upper limit of the number of retransmissions recorded in the retransmission number recording part 18 by 1.5 regarding a voice stream, and can set, as an upper limit of the number of retransmissions in each stream, a value obtained by multiplying the upper limit of the number of retransmissions by 0.7 regarding a video stream.

Examples of a method for identifying a medium type such as a voice stream and a video stream included in multi-medium communication include a method for obtaining information regarding a medium type included in a packet.

Specifically, the bandwidth management part 14 can obtain a medium type included in a stream with reference to the SDP data of the invite packet.

Figure 9:
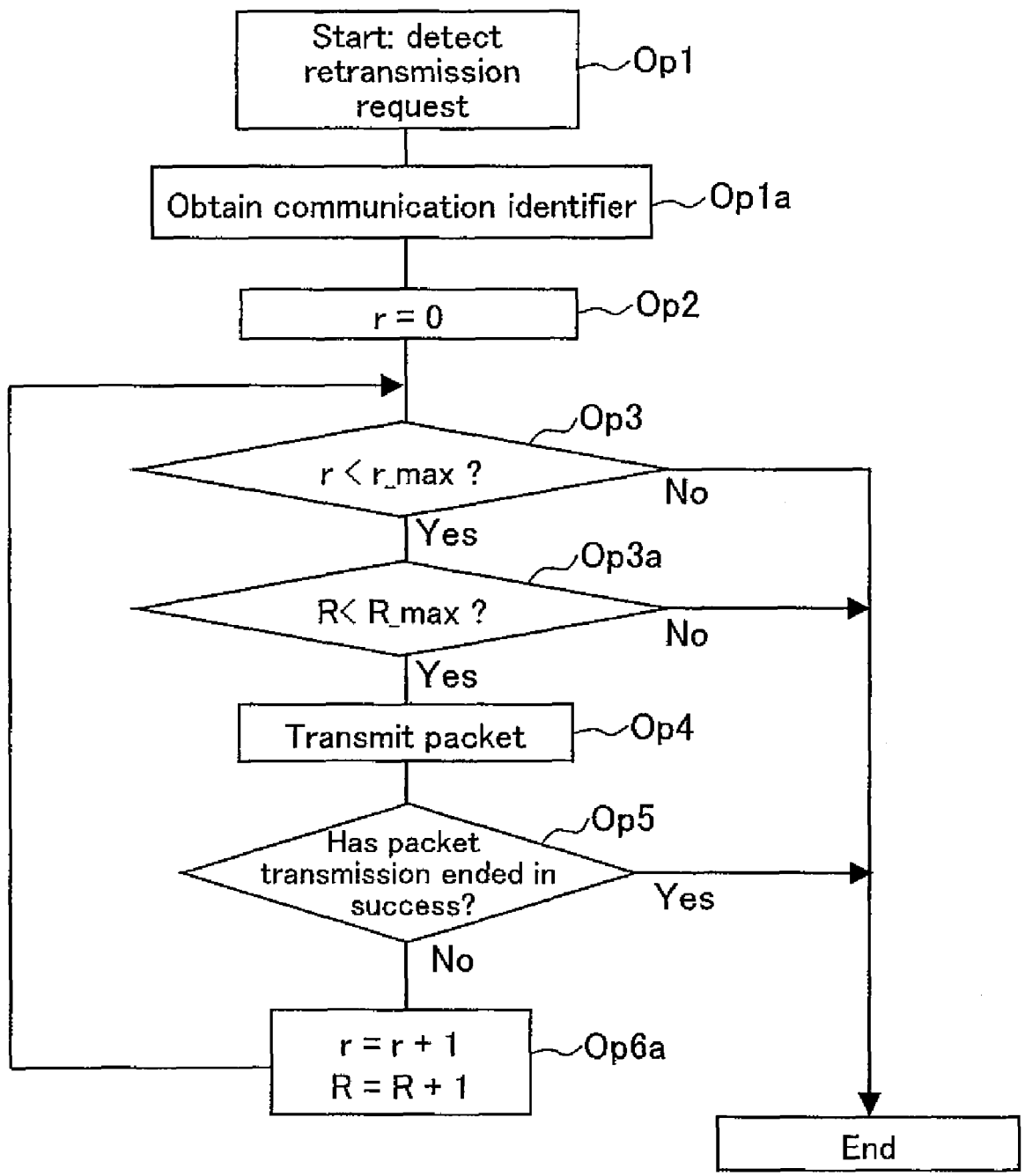
FIG. 9 is a flowchart showing an example of processing in which the retransmitting part retransmits data using an upper limit of the number of retransmissions of each packet for each communication, and an upper limit of a sum of the number of retransmissions during a constant length of time.

FIG. 9 is a flowchart showing an example of the processing of retransmitting a packet, using an upper limit of the number of retransmissions of each packet for each communication and an upper limit of the sum of the number of retransmissions within a constant length of time. In the example shown in FIG. 9, the same operations as those in FIG. 7 are denoted with the same reference numerals as those therein, and the description thereof will be omitted. When starting retransmission processing, the retransmitting part 16 obtains a communication identifier from a packet whose transmission has ended in failure (Op 1a). The communication identifier can be, for example, an IP address and a port number of a wireless terminal that performs communication. In Op 3, when determining whether or not the number of retransmissions has reached an upper limit, the retransmitting part 16 uses values corresponding to the communication represented by the communication identifier obtained in the OP 1a as the variable r representing the current number of retransmissions and the variable r_max representing the upper limit.

FIG. 8B is a diagram showing examples of data on the variables r and r_max corresponding to the respective communication identifiers. For example, in the case where the communication identifier obtained by the retransmitting part 16 in the Op 1a is "192.168.0.100:32267", in the data shown in FIG. 8B, the upper limit value "3" is used as r_max, with the current number "1" of retransmissions corresponding to the data being r. Consequently, the retransmitting part 16 can retransmit a packet by varying the upper limit of the number of retransmissions in accordance with the communication identifier of a packet to be retransmitted.

Although the operation example of the retransmission adjusting part 15 and the retransmitting part 6 has been described, the operations of the retransmission adjusting part 15 and the retransmitting part 16 are not limited to the above example.

Embodiment 2

Figure 10:
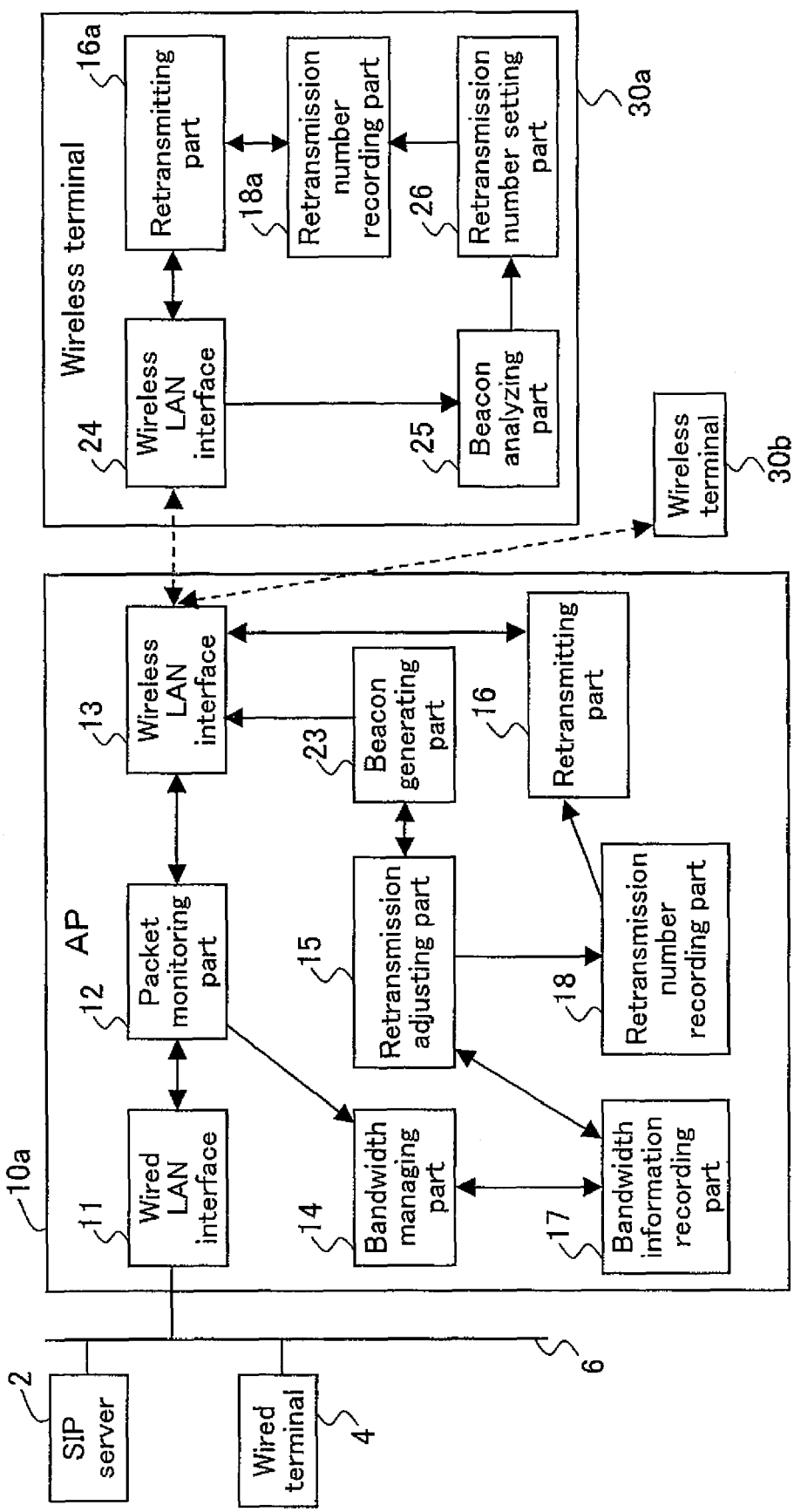
FIG. 10 is a functional block diagram showing a configuration of an AP according to Embodiment 2.

In the present embodiment, the function of controlling a packet retransmission at a wireless terminal is added to Embodiment 1, FIG. 10 is a functional block diagram showing a configuration of the AP 10a according to the present embodiment. In FIG. 10, the same functional blocks as those in FIG. 2 are denoted with the same reference numerals as those therein, and the description thereof will be omitted. The AP 10a shown in FIG. 10 further includes a beacon generating part 23. Furthermore, the wireless terminal 30a includes a wireless LAN interface 24, a beacon analyzing part 25, a retransmission number setting part 26, a retransmission number recording part 18a, and a retransmitting part 16a. a wireless terminal 30b can also have a similar configuration.

The beacon generating part 23 of the AP 10a notifies the wireless terminals 30a, 30b of the upper limit of the number of retransmissions determined by the retransmission adjusting part 15, using a beacon. The beacon generating part 23 generates a beacon including an upper limit of the number of retransmissions determined by the retransmission adjusting part 15, and transmits the beacon to the wireless terminals 30a and 30b via the wireless LAN interface 13. The beacon generating part 23 can record an upper limit of the number of retransmissions, for example, in a bender-specific portion of the beacon.

The retransmission adjusting part 15 updates an upper limit of the number of retransmissions on a predetermined time basis. Therefore, the beacon generating part 23 can also transmit a beacon including an updated upper limit of the number of retransmissions on a predetermined time basis in accordance with the timing of the update. The timing for notification of the upper limit of the number of retransmissions is not limited thereto. The beacon generating part 23 may make a notification of an upper limit of the number of retransmissions at the start of communication or for each packet transmission.

In the case of making a notification of the number of retransmissions varying depending upon the plurality of terminals, the beacon generating part 23 sends a beacon containing a combined data on a terminal ID for identifying a wireless terminal and an upper limit of the number of retransmissions.

At the wireless terminal 30a, the wireless LAN interface 24 receives the beacon sent from the beacon generating part 23 and passes the beacon to the beacon analyzing part 25. The beacon analyzing part 25 analyzes the given beacon, obtains data representing the upper limit of the number of retransmissions, and passes the data to the retransmission number setting part 26. The retransmission number setting part 26 records the upper limit of the number of retransmissions in the retransmission number recording part 18a. The retransmission number recording part 18a can record data with the same configuration as that recorded in the retransmission number recording part 18 of the AP 10a. The retransmitting part 16a performs the retransmission processing of a packet in accordance with the upper limit of the number of retransmissions recorded in the retransmission number recording part 18a. The function of the retransmitting part 16a is the same as that of the retransmitting part 16 of the AP 10a.

Consequently, the wireless terminal 30a can retransmit a packet based on the upper limit of the number of retransmissions determined in the AP 10a. Therefore, a retransmission can be performed in accordance with the bandwidth use situation in the entire radio communication by the AP 10a.

In the present embodiment, an example has been shown in which a wireless terminal is notified of the upper limit of the number of retransmissions using a beacon. However, the method for notifying a wireless terminal of the upper limit of the number of retransmissions is not limited thereto. For example, a wireless terminal can also be notified of the upper limit of the number of retransmissions, using a packet of an application layer such as an ack packet of the SIP. In the case of notifying a wireless terminal of the upper limit of the number of retransmissions for each packet to be sent to the wireless terminal, it is advantageous in terms of the saving of a bandwidth in use, to use an ack packet.

Embodiment 3

Figure 11:
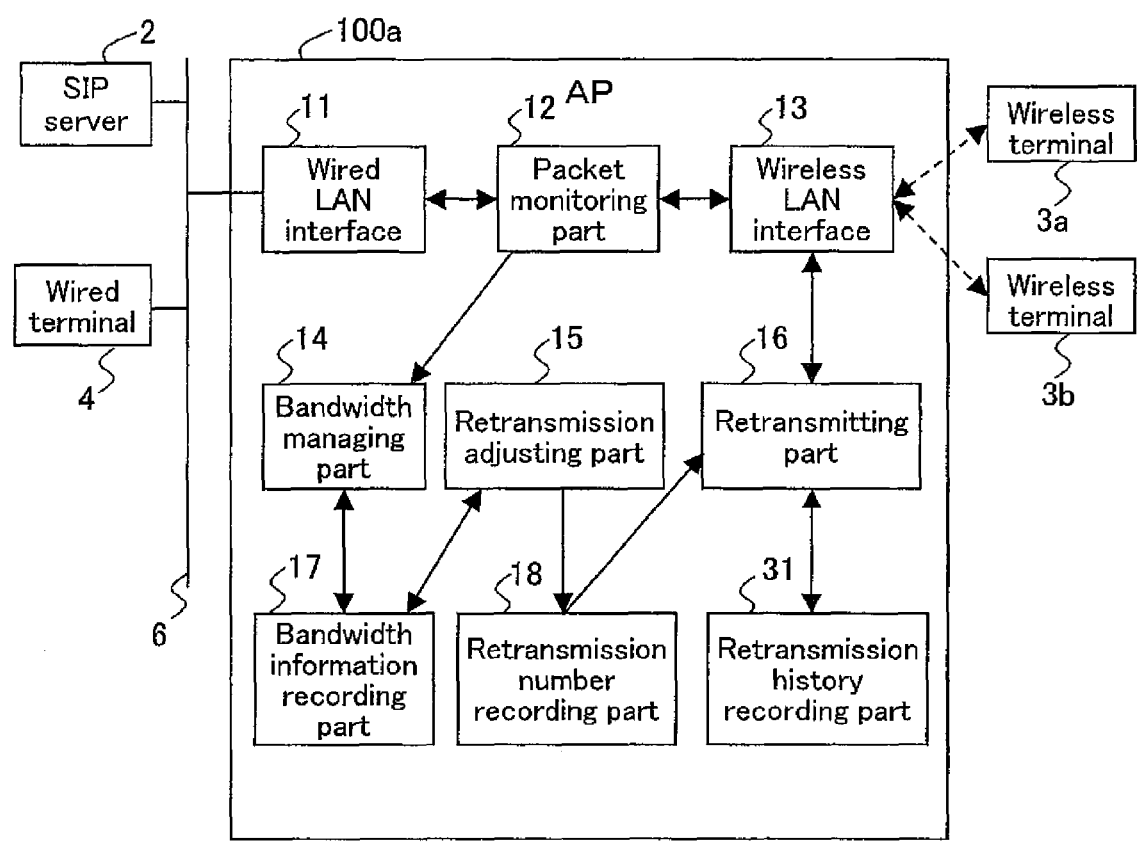
FIG. 11 is a functional block diagram showing a configuration of an AP according to Embodiment 3.

FIG. 11 is a functional block diagram showing a configuration of an AP 100a according to the present embodiment. In FIG. 11, the same functional blocks as those in FIG. 2 are denoted with the same reference numerals as those therein, and the description thereof will be omitted. An AP 100a shown in FIG. 11 further includes a retransmission history recording part 31. The retransmitting part 16a has a function that is not present in the retransmitting part 16 shown in FIG. 2. The retransmitting part 16a determines a transmission interval at which a packet is retransmitted with reference to the retransmission history recording part 31, and retransmits a packet at the determined transmission interval. The retransmission history recording part 31 records a retransmission timing of a packet and a packet transmission success rate at that retransmission timing in such a manner that they are associated with each other. It is preferable that, every time the retransmitting part 16a retransmits a packet, it updates the data recorded in the retransmission history recording part 31.

FIG. 12 is a diagram showing examples of data to be recorded in the retransmission history recording part 31. In a retransmission history table 32 shown in FIG. 12, a terminal ID, a retransmission timing, and a packet transmission success rate are recorded in such a manner that they are associated with each other. The terminal ID is an identifier of a wireless terminal to be a packet destination. For example, a MAC address, an IP address, other nicknames, or the like can be used as a terminal ID. In the retransmission history table 32, as a retransmission timing, identifiers ("0", "1", "2", "3", "4", "5") for identifying a period from a time when the retransmission history table 32 receives a retransmission request to a time when it retransmits a packet are recorded.

Specific examples of a time associated with each identifier include a proportion pattern to be (Time corresponding to identifier n)=n×Constant T regarding an identifier n (n is an integer of 0 or more). In this proportion pattern, for example, assuming that Constant T=50 (μseconds), an identifier "0" is associated with 0 (μseconds), "1" is associated with 50 (μseconds), "2" is associated with 100 (μseconds), "3" is associated with 150 (μseconds), "4" is associated with 200 (μseconds), and "5" is associated with 250 (μseconds). Furthermore, as another pattern, there is the pattern of a power in which (Time corresponding to identifier n)=(Time corresponding to identifier n−1)×Constant T1 (Time corresponding to n=0 is 0 (μseconds), Time corresponding to n=1 is Constant T2) in n>1. In this pattern of a power, for example, assuming that Constant T1=2 and Constant T2=50 (μseconds), the time of an identifier "0" is associated with 0 (μseconds), "1" is associated with 50 (μseconds), "2" is associated with 100 (μseconds), "3" is associated with 200 (μseconds), "4" is associated with 400 (μseconds), and "5" is associated with 800 (μseconds).

The packet transmission success rate is represented, for example, by a probability (%) at which the transmission of a retransmitted packet has ended in success. In FIG. 12, a part of the description recorded in the retransmission history table 32 is omitted. Furthermore, the data to be recorded in the retransmission history recording part 31 is not limited to the retransmission history table 32 shown in FIG. 12. For example, data representing a relationship between a retransmission timing and a packet transmission success rate may be recorded, for example, for each communication identifier or available bandwidth, instead of a terminal ID.

Figure 13:
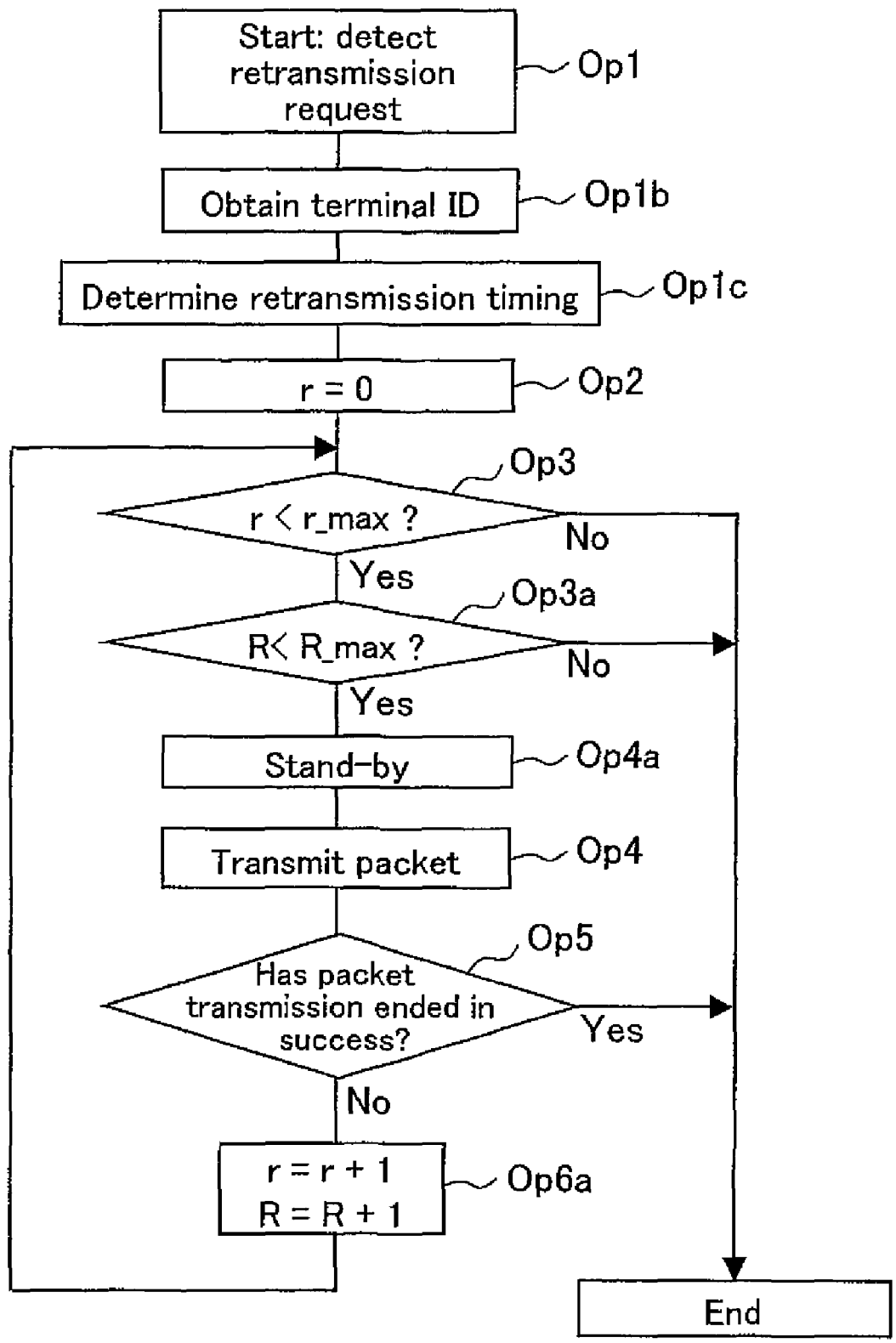
FIG. 13 is a flowchart showing an operation example of a retransmitting part in Embodiment 3.

FIG. 13 is a flowchart showing an operation example of the retransmitting part 16a. In FIG. 13, the same operations as those in FIG. 7 are denoted with the same reference numerals as those therein, and the description thereof will be omitted. When starting retransmission processing, the retransmitting part 16a obtains a terminal ID from a packet whose transmission has ended in failure (Op 1b). The retransmitting part 16a determines a retransmission timing, with reference to a retransmission timing and a packet transmission success rate corresponding to the obtained terminal ID in the retransmission history table 32 (Op 1c). The retransmitting part 16a selects, for example, a retransmission timing at which the success rate is highest among the retransmission timings recorded in the retransmission history table 32. In the example shown in FIG. 12, "5" is selected. Then, the retransmitting part 16a generates a random number at which the probability of the selected retransmission timing becomes highest, and determines a retransmission timing in accordance with the random number. For example, the retransmitting part 16a generates either of "0" to "5" in a random order so that the occurrence probability of the selected retransmission timing "5" is 50%, and each occurrence probability of "0" to "4" is 10%. The generated number is set to be a retransmission timing. Consequently, the transmission success rate of each retransmission timing can be obtained. The method for determining a retransmission timing is not limited thereto. The retransmitting part 16a may set the selected retransmission timing to be a retransmission timing as it is, for example. In the case of retransmitting the same packet a plurality of times, the number of transmissions at the selected retransmission timing may be set to be largest.

When the retransmission timing is determined, the retransmitting part 16a determines whether or not the number of packet retransmissions and the sum of the number of retransmissions within a constant length of time has reached an upper limit (Op 3, Op 3a). In the case of Yes in Op 3 and Op 3a, after standing by in accordance with the retransmission timing determined in Op 1c (Op 4c), the retransmitting part 16a sends a packet (Op 4). The processes after the packet transmission (Op 4) are the same as those in FIG. 7. Due to the stand-by in Op 4a, a packet can be sent at a timing at which the possibility of success of packet transmission is high. In general, even if a packet is retransmitted immediately after the transmission thereof has ended in failure, the retransmission is unlikely to succeed since communication conditions do not change in most cases. Therefore, the retransmitting part 16a can enhance the success rate of the packet transmission by delaying a retransmission timing. Furthermore, during the stand-by in Op 4a, the bandwidth becomes excess accordingly. Therefore, the bandwidth can be effectively utilized by sending another packet through the wireless LAN interface 13.

Embodiment 4

Figure 14:
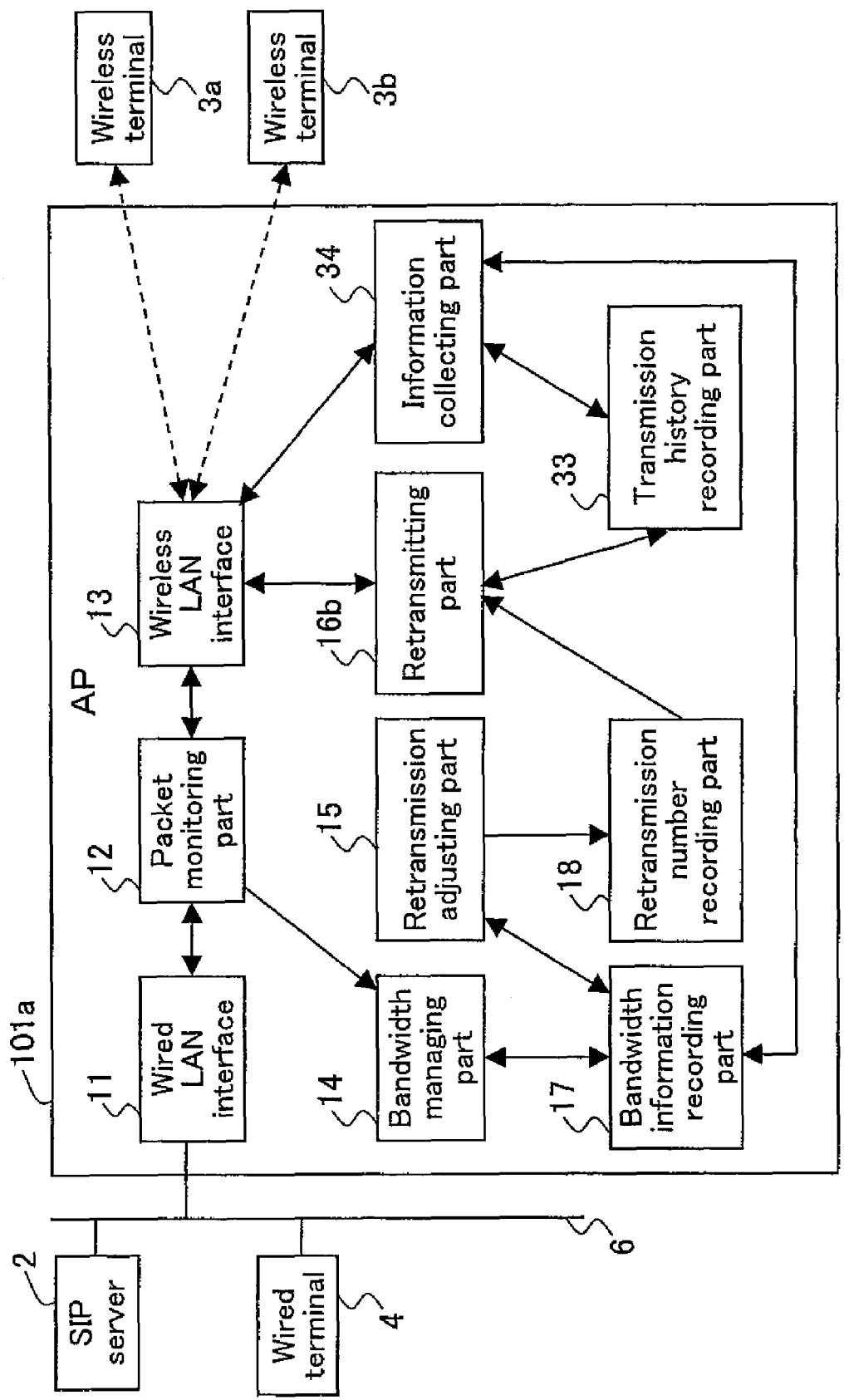
FIG. 14 is a functional block diagram showing a configuration of an AP according to Embodiment 4.

FIG. 14 is a functional block diagram showing a configuration of an AP 101a according to the present embodiment. In FIG. 14, the same functional blocks as those in FIG. 2 are denoted with the same reference numerals as those therein. The AP 101a further includes a transmission history recording part 33 and an information collecting part 34. Furthermore, a retransmitting part 16b has a function that is not present in the retransmitting part 16 shown in FIG. 2. The information collecting part 34 records a link speed and a packet transmission success rate of a packet sent by the wireless LAN interface 13 to wireless terminals 3a, 3b in a communication area in the transmission history recording part 33. The transmitting part 16b selects a link speed at which a packet transmission success rate is expected to increase, with reference to data recorded in the transmission history recording part 33, and retransmits a packet at a link speed based on the selected link speed. The retransmitting part 16b may apply a link speed so that the probability at which a packet is transmitted at the selected link speed becomes highest in the same way as in the case of a retransmission timing in Embodiment 3. Consequently, a packet can be sent at various link speeds, and a transmission success rate with respect to various link speeds can be obtained.

FIG. 15 is a diagram showing examples of data recorded in the transmission history recording part 33. In the example shown in FIG. 15, the link speed of a packet sent by the wireless LAN interface 13 and the data representing a history of a packet transmission success rate are recorded in three link speed history tables 35a, 35b, and 35c. The link speed history table 35a stores a history during a peak time (available bandwidth: 100 kbps or less). The link speed history table 35b stores a history during an intermediate time (available bandwidth: 101 kbps to 300 kbps). The link speed history table 35c stores a history during an off-peak time (available bandwidth: 301 kbps or more). In each of the link speed history tables 35a, 35b, and 35c, a plurality of sets of data in which a link speed and a packet transmission success rate at the link speed are one set are recorded for each communication identifier.

The information collecting part 34 obtains a link speed of a packet to be sent by the wireless LAN interface 13 to a destination wireless terminal, and information representing whether or not the sent packet has reached the destination wireless terminal (success/failure in transmission), and records them in a temporary recording region such as a memory. Furthermore, the information collecting part 34 simultaneously obtains an available bandwidth during each packet transmission from the bandwidth information recording part 17, and records the available bandwidth in the temporary recording region so that the available bandwidth is associated with a link speed for each packet and information representing the success/failure in transmission. Then, regarding a peak time, an intermediate time, and an off-peak time, the information collecting part 34 summarizes a packet transmission success rate for each link speed at a constant time interval. Thus, in the link speed history tables 35a, 35b, and 35c, a link speed and a packet transmission success rate of packet transmission by the wireless LAN interface 13 at a constant time interval are reflected at all times.

Figure 16:
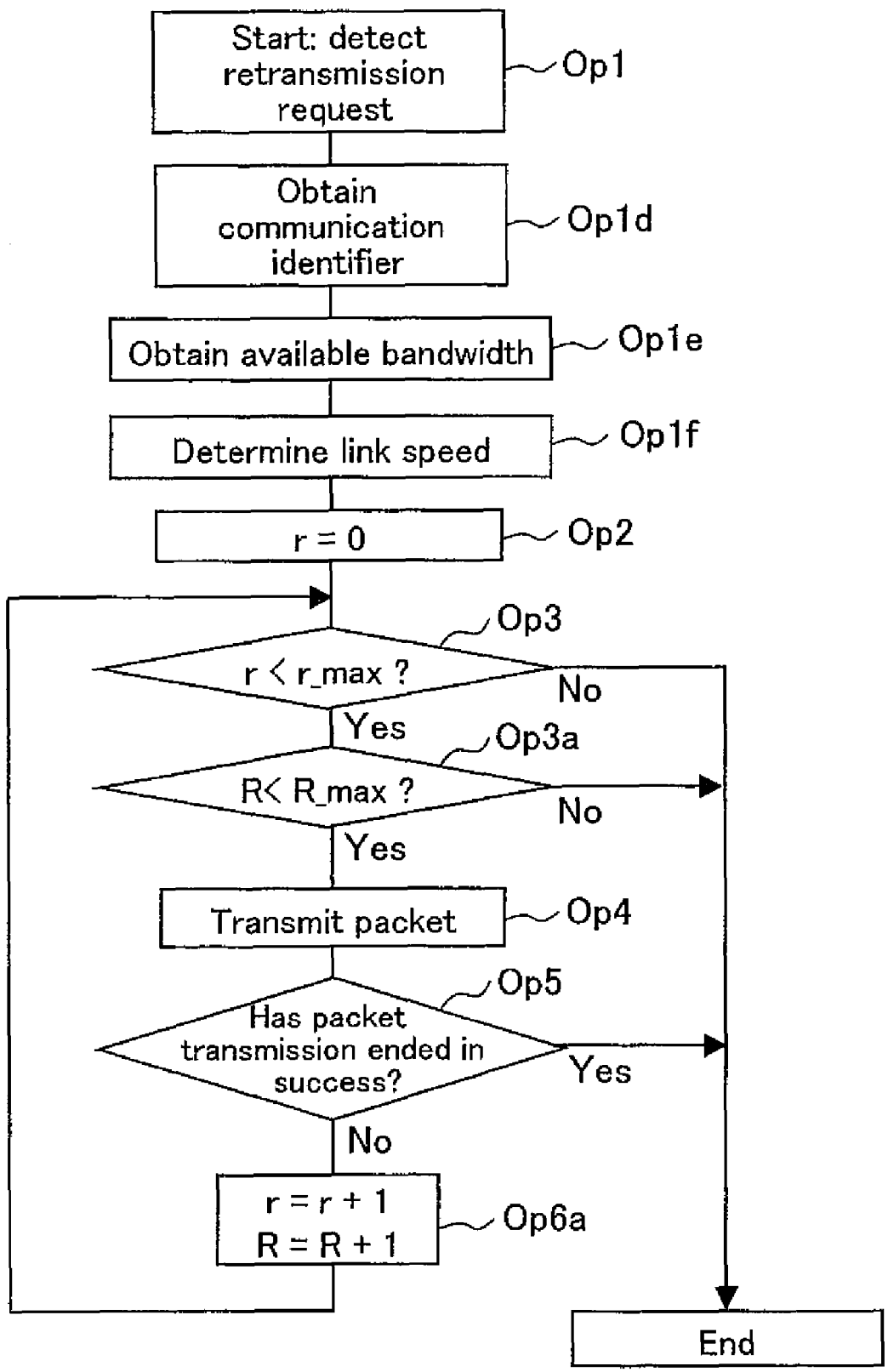
FIG. 16 is a flowchart showing an operation example of the retransmitting part.

The retransmitting part 16b determines a link speed for retransmitting a packet whose transmission has ended in failure with reference to the link speed history tables 35a, 35b, or 35c. FIG. 16 is a flowchart showing an operation example of the retransmitting part 16b. In FIG. 16, the same operations as those in FIG. 7 are denoted with the same reference numerals as those therein, and the description thereof will be omitted. When starting retransmission processing, the retransmitting part 16b obtains a communication identifier from the packet whose transmission has ended in failure (Op 1d). Furthermore, the retransmitting part 16b obtains an available bandwidth from the bandwidth information recording part 17 (Op 1e). After that, the retransmitting part 16b applies a link speed with reference to the data recorded in the transmission history recording part 33 based on the communication identifier and the available bandwidth (Op 1f).

As an example, the case will be described in which, when the communication identifier obtained in Op 1d is "192.168.0.100:32267" and the available bandwidth is "75 kbps", the retransmitting part 16b applies a link speed with reference to the data shown in FIG. 15. In this case, since the available bandwidth is "75 kbps" which is lower than 100 kbps, so that the retransmitting part 16b refers to the link speed history table 35a during a peak time. Then, the retransmitting part 16b selects a link speed "5.5 Mbps" at which a packet transmission success rate is highest among the link speeds of the communication identifier "192.168.0.100:32267" of the link speed history table 35a. The retransmitting part 16b determines a link speed during packet retransmission based on the selected link speed "5.5 Mbps". Consequently, a link speed suitable for a peak time of the communication represented by the communication identifier "192.168.0.100:32267" is obtained.

When the link speed is applied, the retransmitting part 16b determines whether or not the number of packet retransmissions and the sum of the number of retransmissions within a constant length of time has reached an upper limit (Op 3, Op 3a). In the case of Yes in Op 3 and Op 3a, the retransmitting part 16b sends a packet at the link speed applied in Op 1f (Op 4). Consequently, the retransmitting part 16b can send a packet at a link speed in accordance with the available bandwidth. The processes in Op 4 and subsequent operations are the same as those in FIG. 7.

The data to be recorded in the link speed history recording part is not limited to the examples shown in FIG. 15. For example, as shown in FIG. 15, values representing a link speed and a packet transmission success rate may be recorded for each communication identifier in one table, without a table being divided in accordance with the available bandwidth. Furthermore, only a packet transmission success rate may be recorded for each communication identifier. In this case, the retransmitting part 16b can apply a link speed based on a packet transmission success rate. For example, the retransmitting part 16b retransmits a packet with a link speed decreased in the case where the packet transmission success rate is less than a predetermined threshold value, whereby the possibility for a retransmission packet to reach a destination wireless terminal can be enhanced. Thus, the data to be recorded in the link speed history recording part only need to represent a relationship between a link speed and a packet transmission success rate.

Embodiment 5

Figure 17:
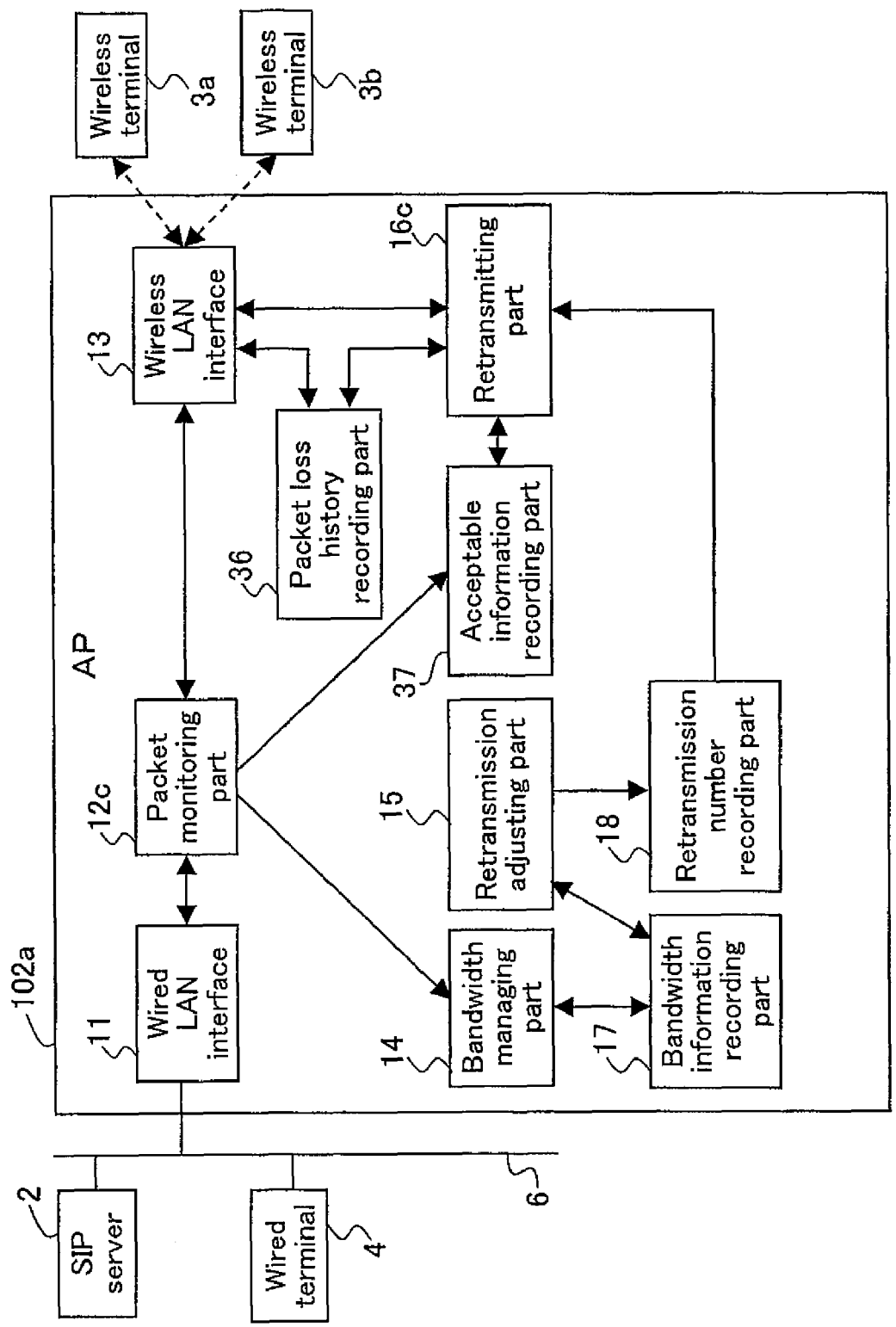
FIG. 17 is a functional block diagram showing a configuration of an AP according to Embodiment 5.

FIG. 17 is a functional block diagram showing a configuration of the AP 102a according to the present embodiment. In FIG. 17, the same functional blocks as those in FIG. 2 are denoted with the same reference numerals as those therein, and the description thereof will be omitted. The AP 102a further includes a packet loss history recording part 36 and an acceptable information recording part 37. Furthermore, a retransmitting part 16c and a packet monitoring part 12c have functions that are not present in the retransmitting part 16 and the packet monitoring part 12 shown in FIG. 2.

The packet loss history recording part 36 records a history of a packet loss caused by the packet transmission failure of the wireless LAN interface 13 with respect to the respective wireless terminals 3a, 3b. The data of the packet loss history recording part 36 is updated always in accordance with the packet transmission situation of the wireless LAN interface 13. FIG. 18 shows examples of data to be recorded in the packet loss history recording part 36. In the packet loss history table 38 shown in FIG. 18, the count of sequential packet losses is recorded for each terminal ID. For example, the packet transmission of a terminal ID="terminal A" with respect to a wireless terminal has ended in failure, and the retransmitting part 16c has not succeeded in packet transmission even when it repeats packet retransmission until the number of retransmissions reaches an upper limit, the packet is discarded. More specifically, a packet loss occurs. At this time, an update of adding 1 to the count of sequential packet losses of the terminal A of the packet loss history table 38 is performed. After that, when the packet transmission to the terminal A ends in success, the count of sequential packet losses is reset to "0". Conversely, when packet losses occur continuously, the count of sequential packet losses is incremented. Consequently, the count of sequential packet losses is recorded in the packet loss history table 38.

The packet monitoring part 12c obtains data that represents the condition of the count of sequential packet losses acceptable in radio communication of the wireless terminals 3a and 3b from the packet received by the wireless LAN interface 13 and records it in the acceptable information recording part 37. For example, in the case where the wireless terminals 3a, 3b can use a PLC (packet loss concealment) technique, the wireless terminals 3a, 3b send a PLC information packet for making a notification of PLC information to the AP 102a. The PLC information packet contains data representing the condition of the count of sequential packet losses acceptable in a communication. When detecting the PLC information packet, the packet monitoring part 12c records the contents thereof in the acceptable information recording part 37. Thus, in the acceptable information recording part 37, data representing the condition of the count of sequential packet losses acceptable in radio communication by the wireless terminals 3a, 3b are recorded.

FIG. 19 shows examples of data to be recorded in the acceptable information recording part 37. In the examples shown in FIG. 19, an upper limit and a lower limit of a range of a count of sequential packet losses that cannot be accepted are recorded for each terminal ID. For example, in the case where the count of sequential packet losses is not in a range of the lower limit "2" to the upper limit "5", the data of a terminal ID="terminal A" shows that a packet loss is acceptable. The reason for this is as follows: when the count of sequential packet losses is the lower limit "2" or less, it is not necessary to retransmit a packet since the degradation in sound quality caused by a packet loss can be concealed by the PLC technique, and when the packet loss is the upper limit "5" or more, the degradation in sound quality has already been remarkable, so that it is not necessary to send a packet even by retransmitting it. The values of the lower limit and the upper limit are determined depending upon the ability of the PLC function of a terminal.

The retransmitting part 16c obtains the count of sequential packet losses at the destination wireless terminal (for example, referred to as the wireless terminal 3a) of a packet to be retransmitted from the packet loss history recording part 36. Furthermore, the retransmitting part 16c determines whether or not the obtained count of sequential packet losses corresponds to the condition of the count of sequential packet losses acceptable in radio communication of the wireless terminal 3a, with reference to the acceptable information recording part 37, and discards the packet without retransmitting it in the case where the count corresponds to the condition.

Figure 20:
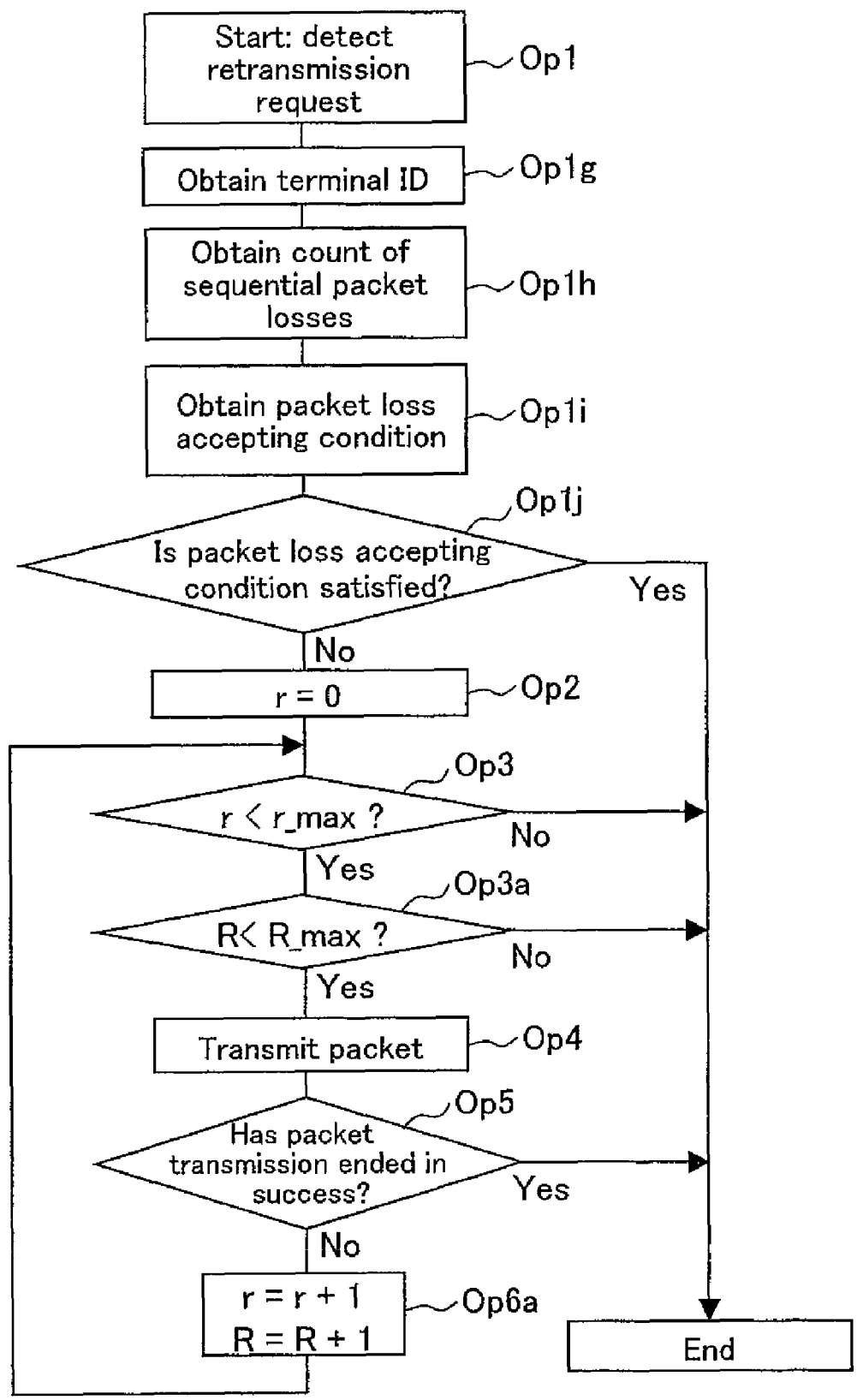
FIG. 20 is a flowchart showing an operation example of a retransmitting part in Embodiment 5.

FIG. 20 is a flowchart showing an operation example of the retransmitting part 16c. In FIG. 20, the same operations as those in FIG. 7 are denoted with the same reference numerals as those therein, and the description thereof will be omitted. When starting retransmission processing, the retransmitting part 16c obtains a terminal ID of a packet whose transmission has ended in failure (Op 1g). Furthermore, the retransmitting part 16c obtains the count of sequential packet losses of a wireless terminal represented by the terminal ID from the packet loss history recording part 36 (Op 1h). For example, in the case where Terminal ID="Terminal A", the retransmitting part 16c obtains a count of sequential packet losses "0" from the packet loss history table 38 shown in FIG. 18.

Furthermore, the retransmitting part 16c obtains acceptable conditions of a count of sequential packet losses of a wireless terminal represented by a terminal ID from the acceptable information recording part 37 (Op 1i). For example, in the case where terminal ID="Terminal A", the retransmitting part 16c obtains the lower limit "3" and the upper limit "5," of the count of sequential packet losses for which packet losses cannot be accepted from the data shown in FIG. 19.

Next, the retransmitting part 16c determines whether or not the count of sequential packet losses obtained in Op 1h satisfies the acceptable conditions obtained in Op 1i (Op 1j). For example, in the case where Terminal ID="Terminal A", the count of sequential packet losses "0" is not in a range of the lower limit "3" to the upper limit "5" of the count of sequential packet losses for which packet losses cannot be accepted, so that the retransmitting part 16c determines that the packet loss acceptable conditions are satisfied. In this case, the processing is completed without sending a packet.

For example, in the case where the count of sequential packet losses obtained in Op 1h is "3", etc, the packet loss acceptable conditions are not satisfied. Therefore, the retransmitting part 16c performs the processes in Op 2 and subsequent processes. The processes in Op 2 and subsequent processes are the same as those in FIG. 7. More specifically, in the case where the count of sequential packet losses is in a range of "3", to "5", a packet is retransmitted. The upper limit of the retransmission number in this case is an upper limit of the retransmission number determined by the retransmission adjusting part 15.

As described above, due to the processing shown in FIG. 20, in the case where a packet loss is acceptable at a wireless terminal of a packet destination, the retransmitting part 16c does not need to retransmit a packet. Consequently, the increase in a bandwidth in use by the retransmission of a packet can be suppressed.

The present embodiment can be applied to special communication, for example, among communications with sequence numbers allocated to packets. More specifically, the present embodiment can be applied to the following communication: even if packets of partial sequence numbers drop out, there is no effect on the communication quality; however, when sequence numbers drop out sequentially, the communication quality is degraded. Examples of such communication include voice communication and video communication.

In order to keep the above-mentioned communication in high quality, sequence numbers may be prevented from dropping out sequentially. Therefore, as shown in FIG. 18 in the present embodiment, the count of sequential packet losses is stored for each communication.

Then, as shown in FIG. 19, in the case where the count of sequential packet losses is small to such a degree that the quality is not degraded, the upper limit of the packet retransmission number is set to be a small number of times (or 0). This saves a bandwidth. In the case where the count of sequential packet losses is large to such a degree that the quality is degraded remarkably, the upper limit of the packet retransmission number is set to be a large number of times. This keeps the quality. Furthermore, in the case where the count of sequential packet losses is an extremely large number of times, the upper limit of the packet retransmission number is set to be a small number of times (or 0), whereby the bandwidth can be saved. This is because, in the case where the count of sequential packet losses is an extremely large number of times, the rapid improvement of a situation cannot be expected.

Thus, according to the present embodiment, the quality of the above-mentioned communication can be kept high while the bandwidth is being saved.

Embodiment 6

Figure 21:
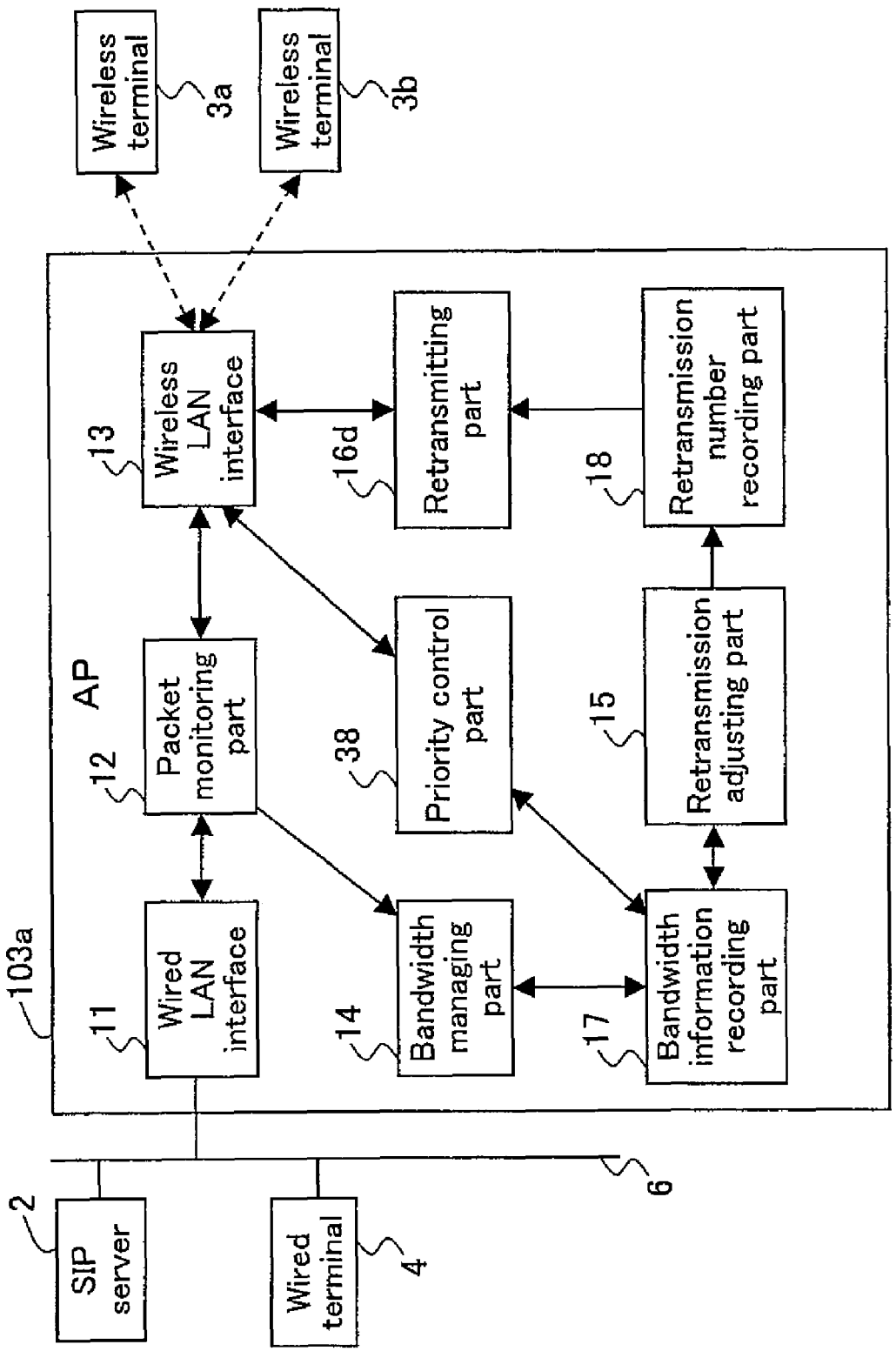
FIG. 21 is a functional block diagram showing a configuration of an AP according to Embodiment 6.

FIG. 21 is a functional block diagram showing a configuration of an AP 103a according to the present embodiment. In FIG. 21, the same functional blocks as those in FIG. 2 are denoted with the same reference numerals as those therein, and the description thereof will be omitted. The AP 103a shown in FIG. 21 further includes a priority control part 38. Furthermore, in the bandwidth information recording part 17, a prioritized communication identifier representing prioritized communication of relaying a packet by priority is recorded. More specifically, the bandwidth managing part 14 records only information on the communication of a packet to be relayed by priority in the bandwidth information recording part 17.

The priority control part 38 controls the wireless LAN interface 13 so as to relay a packet (hereinafter, referred to as a prioritized packet) of communication recorded in the bandwidth information recording part 17 by priority. As a system for relaying a packet by priority, for example, a prioritized communication system in conformity with IEEE 802.11e can be used. For example, in the case where the transmission of a prioritized packet and the transmission of a non-prioritized packet occur simultaneously, the priority control part 38 can control the wireless LAN interface 13 so as to send the prioritized packet in advance.

Even in the present embodiment, in the bandwidth information recording part 17, for example, data shown in FIG. 3 is recorded. A packet of communication represented by a communication identifier recorded in the bandwidth management table 21 shown in FIG. 3 is relayed by priority. More specifically, the communication represented by the communication identifier recorded in the bandwidth management table 21 is prioritized communication. As an example of the prioritized communication, real-time communication such as telephone communication is assumed. Furthermore, as an example of the non-prioritized communication that is not recorded in the bandwidth management table 21, data communication such as Hyper Text Transfer Protocol (HTTP) and File Transfer Protocol (FTP) is assumed.

FIG. 22A is a diagram showing data to be recorded in the retransmission number recording part 18 in the present embodiment. In the example shown in FIG. 22A, upper limits respectively corresponding to communication identifiers representing communication performed via the AP 103a are recorded. Furthermore, an upper limit of the retransmission number of communication (Other: non-prioritized communication) other than the communication represented by the communication identifier, and an upper limit of the sum of the number of retransmissions within a constant length of time are recorded. Herein, the upper limit "10" that is the number of retransmissions of non-prioritized communication is a previously fixed value, and is not updated by the retransmission adjusting part 15. The upper limit other than the upper limit of the number of retransmissions of non-prioritized communication is updated for each constant time by the retransmission adjusting part 15 in the same way as in Embodiment 1.

In the case where the transmission of a prioritized packet and the transmission of a non-prioritized packet occur simultaneously, when a prioritized packet is set to be sent in advance without fail, the effect of reducing a data loss in non-prioritized communication is obtained by setting the upper limit of the number of retransmissions of a non-prioritized packet to be a relatively high fixed value. As an example of the non-prioritized communication, data communication such as HTTP and FTP is assumed. In such data communication, unlike the real-time communication such as telephone conversation assumed to be prioritized communication, although the delay of a packet is acceptable, the loss of a packet is not acceptable. For example, a compressed file to be sent in data communication cannot be decompressed if there is an error of 1 bit. Therefore, in the case where a data loss occurs, a loss packet is retransmitted often by an application through which the packet has been sent. In this case, communication is performed again over the entire communication path, so that excess traffic increases in the communication path and excess processing is performed even in the application. Therefore, in data communication, it is more efficient to decrease a data loss by accepting a largest possible number of retransmissions at the AP 103a and the wireless terminals 3a, 3b.

For example, in the case where the transmission of a prioritized packet and the transmission of a non-prioritized packet occur simultaneously, when a prioritized packet is set to be sent in advance at a predetermined probability of less than 100%, there is a possibility that the retransmission of a packet in the non-prioritized communication may impose strain on the communication bandwidth of prioritized communication. In this case, the retransmission adjusting part 15 may change the upper limit of the number of retransmissions of the non-prioritized communication in accordance with a bandwidth in use without setting the upper limit of the number of retransmissions in the non-prioritized communication to be a fixed value.

Figure 23:
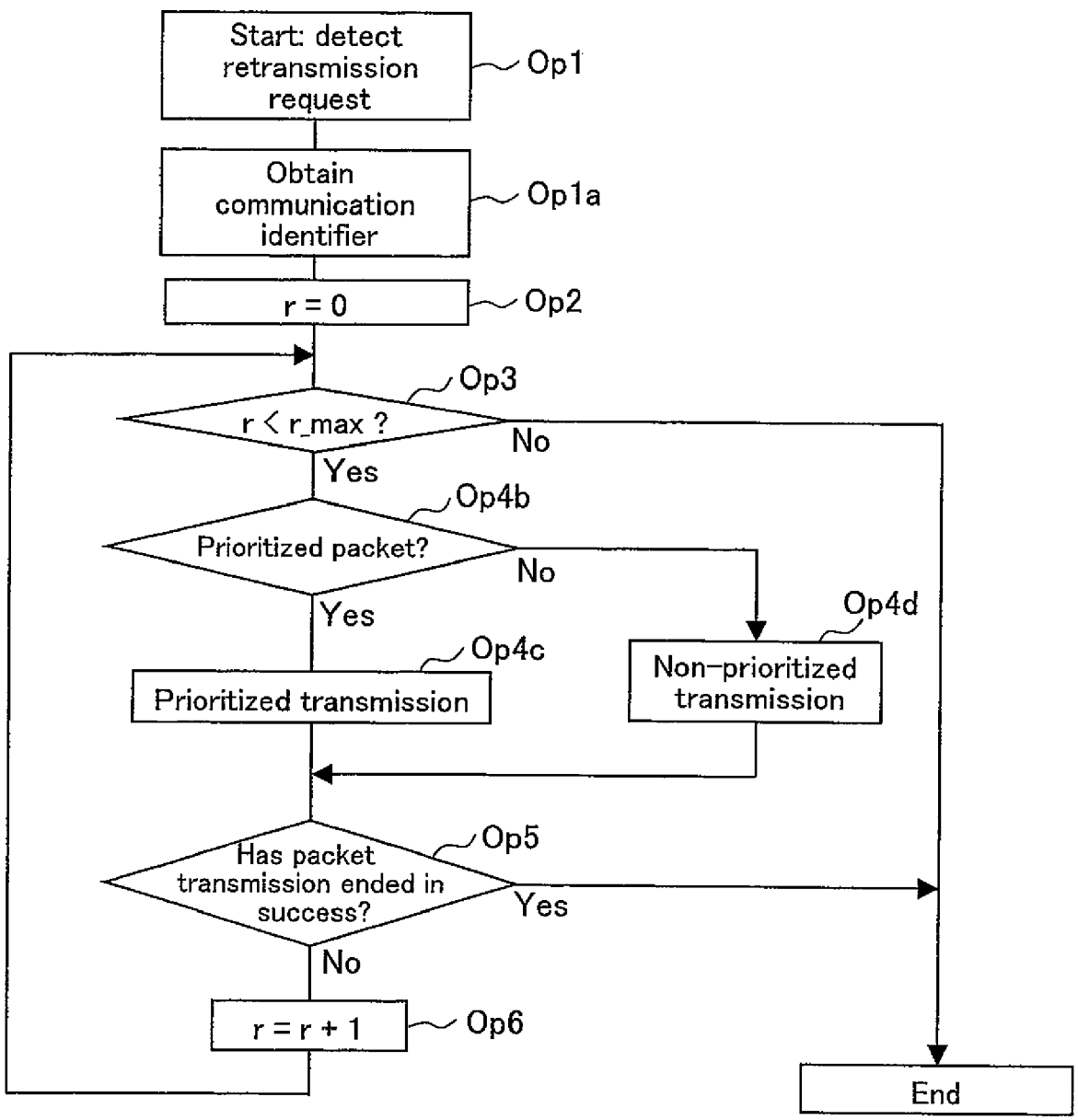
FIG. 23 is a flowchart showing an example of processing in which a priority control part and a retransmitting part retransmit data.

FIG. 23 is a flowchart showing an example of the processing in which the retransmitting part 16d retransmits a packet. In the example shown in FIG. 23, the same operations as those in FIG. 5 are denoted with the same reference numerals as those therein, and the description thereof will be omitted. When starting retransmission processing (Op 1), the retransmitting part 16d obtains a communication identifier from a packet whose transmission has ended in failure (Op 1a).

In the processing in which the retransmitting part 16d determines whether or not the number of retransmissions has reached an upper limit in Op 3, an upper limit value r_max varies depending upon the communication identifier obtained in Op 1a. An example thereof will be described below. FIG. 22B is a prioritized communication diagram showing examples of data on variables r and r_max used in the determination in Op 3. The values r_max shown in FIG. 22B are the same as the upper limit values shown in FIG. 22(B). More specifically, with respect to a packet having a communication identifier in prioritized communication, an upper limit determined by the retransmission adjusting part 15 for each communication identifier is used for the value of r_max, and with respect to a packet having a communication identifier of non-prioritized communication, a fixed value "10" is used as the value of r_max. Because of this, the upper limit of the number retransmissions of a packet in prioritized communication is an upper limit to be updated in accordance with the use situation of a bandwidth, and the upper limit of the number of retransmissions of a packet in non-prioritized communication is a previously determined fixed upper limit.

Furthermore, the retransmitting part 16d determines whether or not a packet whose transmission has ended in failure is a packet in prioritized communication or a packet in non-prioritized communication, with reference to the retransmission number recording part 18, based on the obtained communication identifier (Op 4b). For example, in the case where the obtained communication identifier is "192.168.0.100:32267", the retransmitting part 16d can determine that the communication of the packet whose transmission has ended in failure is prioritized communication, since the communication identifier is recorded, with reference to the data shown in FIG. 22A.

If the packet whose transmission has ended in failure is a packet in prioritized communication (Yes in Op 4d), the packet is sent by priority through the wireless LAN interface 13 (Op 4c). If the packet whose transmission has ended in failure is not a packet in prioritized communication (No in Op 4b), the packet is sent by non-prioritized through the wireless LAN interface 13 (Op 4d). More specifically, a retransmission packet in prioritized communication is assigned a bandwidth by priority. Therefore, in the case where a bandwidth is insufficient in the radio communication of the AP 103a, a packet in prioritized communication is sent by priority, so that the packet in non-prioritized communication is delayed.

As described above, due to the operation shown in FIG. 23, in the case where a bandwidth is insufficient, the upper limit of the number of retransmissions is suppressed to prevent a delay in prioritized communication, and a predetermined number of retransmissions is ensured in non-prioritized communication, although the possibility of a delay increases. Therefore, a packet loss is suppressed, and the possibility that packets can be sent in the order of a packet arrival increases. For example, by setting data communication in non-prioritized communication, with the real-time voice communication such as telephone conversation being prioritized communication, in the real-time voice communication, the delay of a packet can be suppressed, and in the data communication, a packet can be sent with reliability kept constantly in the order of a packet arrival.

As described above, in Embodiments 1-6, as an example, the configuration and operation of an AP for a wireless LAN has been described. The wireless LAN is a specification of a short-distance wireless network determined by IEEE 802.11. However, the relay apparatus according to the present invention is not limited to an AP for a wireless LAN. For example, the relay apparatus of the present invention is also applicable to an AP for a wireless metropolitan area network (MAN) that is a specification of a long-distance wireless network determined by WiMAX.

Furthermore, in the above-mentioned embodiment, although the case has been described in which the wireless terminals 3a-3d, 30a, and 30b are those which have a function of an IP telephone, the function of the wireless terminals is not limited to that of the IP telephone. The wireless terminals may have functions of, for example, a video reproducing terminal, a PDA, an electronic organizer, a game machine, and a GPS terminal. Furthermore, the communication of a wireless terminal whose start is controlled by the SIP server 2 is not limited to voice communication. Examples of the communication of the wireless terminals include video distribution, music distribution, an online game, stock price information distribution, remote presentation, a TV conference, and monitoring camera image transmission.

The present invention can be used as a relay apparatus for relaying communication by a plurality of wireless terminals in a communication area while keeping constant communication quality in a limited bandwidth.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A relay apparatus for relaying a packet to be transmitted in radio communication by at least one wireless terminal in a communication area, comprising:
    a packet monitoring part for obtaining data on a bandwidth used in the radio communication by the wireless terminal from the packet to be relayed by the relay apparatus;
    a bandwidth managing part for calculating and recording a total bandwidth in use used for the radio communication by the wireless terminal in the communication area based on the data obtained by the packet monitoring part;
    a retransmission adjusting part for determining an upper limit of a packet retransmission number in accordance with an amount of an available bandwidth obtained by excluding the total bandwidth in use from a maximum bandwidth available in the radio communication by the wireless terminal; and
    a retransmitting part for retransmitting a packet whose transmission has ended in failure by the relay apparatus, in a range not exceeding the upper limit of the packet retransmission number determined by the retransmission adjusting part.

2. The relay apparatus according to claim 1, wherein the retransmission adjusting part divides the available bandwidth by the number of wireless terminals that perform the radio communication in the communication area to obtain an available bandwidth per wireless terminal, and determines the upper limit of the packet retransmission number for each wireless terminal, using the available bandwidth per wireless terminal.

3. The relay apparatus according to claim 1, wherein the retransmission adjusting part sets the upper limit of the packet retransmission number by the relay apparatus within a constant length of time in accordance with the available bandwidth.

4. The relay apparatus according to claim 1, wherein the retransmission adjusting part sets the upper limit of the packet retransmission number for each radio communication performed by the wireless terminal.

5. The relay apparatus according to claim 1, further comprising a transmission history recording part for recording a communication identifier for identifying communication of the packet to be relayed by the relay apparatus and relationship data that represents a relationship between a link speed in communication represented by the communication identifier and a packet transmission success rate,
    wherein when retransmitting the packet of the communication represented by the communication identifier recorded in the transmission history recording part, the retransmitting part applies a link speed at which the packet transmission success rate in the communication represented by the communication identifier is highest based on the relationship data, and retransmits the packet based on the applied link speed.

6. The relay apparatus according to claim 1, further comprising a retransmission history recording part for recording relationship data that represents a relationship between a retransmission timing of a packet retransmitted by the retransmitting part and a packet transmission success rate,
    wherein the retransmitting part determines a retransmission timing at which the packet transmission success rate is highest based on the relationship data, and determines a transmission interval at which a packet whose transmission has ended in failure by the relay apparatus based on the determined retransmission timing.

7. The relay apparatus according to claim 1, further comprising:
    a packet loss history recording part for recording a history of a packet loss caused by a packet transmission failure of the relay apparatus for each wireless terminal; and
    an acceptable information recording part for recording data that represents a condition of a count of sequential packet losses acceptable in the radio communication for each wireless terminal,
    wherein the packet monitoring part obtains data that represents a condition of the count of sequential packet losses acceptable in the radio communication of the wireless terminal from a packet to be relayed by the relay apparatus and records the data in the acceptable information recording part, and the retransmitting part obtains a count of sequential packet losses at a destination wireless terminal of a packet to be retransmitted from the packet loss history recording part, determines whether or not the obtained count of sequential packet losses corresponds to the condition of the count of the sequential packet losses acceptable in the radio communication of the destination wireless terminal represented by the data recorded in the acceptable information recording part, and in a case where the obtained count of sequential packet losses corresponds to the condition, discards the packet without retransmitting it.

8. The relay apparatus according to claim 1, further comprising a retransmission number sending part for notifying the wireless terminal of an upper limit of the packet retransmission number determined by the retransmission adjusting part.

9. The relay apparatus according to claim 1, further comprising:
  a priority communication recording part for recording a prioritized communication identifier that represents prioritized communication through which the relay apparatus relays a packet by priority; and
  a priority control part for sending the packet in the prioritized communication represented by the prioritized communication identifier by priority,
  wherein the retransmission adjusting part determines an upper limit of a packet retransmission number, in accordance with an amount of an available bandwidth obtained by excluding the total bandwidth in use from the maximum bandwidth available in the radio communication of the relay apparatus, only with respect to a packet of the prioritized communication, and
  the retransmitting part retransmits the packet in the prioritized communication represented by the prioritized communication identifier among packets whose transmissions have ended in failure by the relay apparatus in a range not exceeding the upper limit of the packet retransmission number determined by the retransmission adjusting part, and retransmits a packet in communication other than the prioritized communication represented by the prioritized communication identifier among packets whose transmissions have ended in failure by the relay apparatus by a predetermined number of times.

10. A relay method for relaying a packet to be transmitted in radio communication by at least one wireless terminal in a communication area, comprising:
  obtaining data on a bandwidth used in the radio communication by the wireless terminal from the packet to be relayed by the relay apparatus;
  calculating and recording a total bandwidth in use used for the radio communication by the wireless terminal in the communication area based on the obtained data;
  determining an upper limit of a packet retransmission number in accordance with an amount of an available bandwidth obtained by excluding the total bandwidth in use from a maximum bandwidth available in the radio communication by the wireless terminal; and
  retransmitting a packet whose transmission has ended in failure by the relay apparatus, in a range not exceeding the upper limit of the packet retransmission number.

11. A recording medium storing a relay program for causing a relay apparatus including a computer to execute processing of relaying a packet to be transmitted in wireless communication by at least one wireless terminal in a communication area, the relay program causing the relay apparatus to execute:
  packet monitoring processing of obtaining data on a bandwidth used in radio communication by the wireless terminal from the packet to be relayed by the relay apparatus;
  bandwidth management processing of calculating and recording a total bandwidth in use used for the radio communication by the wireless terminal in the communication area based on the data obtained in the packet monitoring processing;
  retransmission adjustment processing of determining an upper limit of a packet retransmission number, in accordance with an amount of an available bandwidth obtained by excluding the total bandwidth in use from a maximum bandwidth available in the radio communication by the wireless terminal; and
  retransmission processing of retransmitting a packet whose transmission has ended in failure by the relay apparatus in a range not exceeding the upper limit of the packet retransmission number determined by the retransmission adjusting processing.

* * * * *